United States Patent
Suzuki et al.

(10) Patent No.: US 7,502,041 B2
(45) Date of Patent: Mar. 10, 2009

(54) METHOD AND APPARATUS FOR IMAGE FORMING CAPABLE OF SYNTHESIZING A FULL COLOR IMAGE WITHOUT CAUSING DEVIATIONS OF COLOR LAYERS

(75) Inventors: Shingo Suzuki, Yokohama (JP); Nobuyuki Yanagawa, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 455 days.

(21) Appl. No.: 11/168,452

(22) Filed: Jun. 29, 2005

(65) Prior Publication Data

US 2005/0285922 A1    Dec. 29, 2005

(30) Foreign Application Priority Data

Jun. 29, 2004    (JP) ............... 2004-191795

(51) Int. Cl.
- B41J 2/385    (2006.01)
- B41J 2/435    (2006.01)
- B41J 2/47     (2006.01)
- G03G 15/01    (2006.01)

(52) U.S. Cl. ............... 347/116; 347/248; 347/250; 347/251; 347/234; 347/235; 399/301

(58) Field of Classification Search ............... 347/116, 347/248, 249, 250, 251, 234, 235; 399/301
See application file for complete search history.

(56) References Cited

U.S. PATENT DOCUMENTS

| | | |
|---|---|---|
| 4,348,106 A | 9/1982 | Suzuki et al. |
| 4,359,670 A | 11/1982 | Hosaka et al. |
| 4,364,656 A | 12/1982 | Yanagawa |
| 4,365,888 A | 12/1982 | Hosaka et al. |
| 4,378,416 A | 3/1983 | Yanagawa et al. |

(Continued)

FOREIGN PATENT DOCUMENTS

JP    2000-305417    11/2000

(Continued)

OTHER PUBLICATIONS

U.S. Appl. No. 11/357,032, filed Feb. 21, 2006, Suzuki et al.

*Primary Examiner*—Manish S Shah
*Assistant Examiner*—Sarah Al-Hashimi
(74) *Attorney, Agent, or Firm*—Oblon, Spivak, McClelland, Maier & Neustadt, P.C.

(57) ABSTRACT

An image forming apparatus includes an intermediate transfer member, a sensor, and two image forming units. Each of the image forming units includes an image carrier, an image writer, two development rollers, and a switcher. The image writer writes an electrostatic latent image on the image carrier. Each of the development rollers selectively driven by the switcher visualizes the electrostatic latent image to form toner images in four colors. The toner images are transferred and superimposed onto the intermediate transfer member to form a color toner image. The color toner image is transferred onto a transfer sheet. One or more marks are formed on the intermediate transfer member. The sensor detects one of the marks. The image writer starts writing in synchronism with a sync clock signal of the image writer output immediately after the sensor detects the mark or output after a predetermined time period elapses after the sensor detects the mark.

31 Claims, 10 Drawing Sheets

U.S. PATENT DOCUMENTS

| | | | |
|---|---|---|---|
| 4,402,103 | A | 9/1983 | Yanagawa et al. |
| 4,406,535 | A | 9/1983 | Sakamoto et al. |
| 4,451,139 | A | 5/1984 | Yanagawa et al. |
| 4,474,453 | A | 10/1984 | Yanagawa et al. |
| 4,487,501 | A | 12/1984 | Suzuki et al. |
| 4,615,607 | A | 10/1986 | Yanagawa et al. |
| 4,717,939 | A | 1/1988 | Yanagawa |
| 5,121,171 | A * | 6/1992 | Knapp .................. 399/299 |
| 6,157,797 | A | 12/2000 | Saito et al. |
| 6,215,974 | B1 | 4/2001 | Katoh et al. |
| 6,222,566 | B1 * | 4/2001 | Takeyama et al. ........... 347/116 |
| 6,256,461 | B1 | 7/2001 | Takeyama et al. |
| 6,263,178 | B1 | 7/2001 | Takeyama et al. |
| 6,292,641 | B1 | 9/2001 | Takeyama et al. |
| 6,332,066 | B1 | 12/2001 | Yanagawa |
| 6,336,024 | B1 * | 1/2002 | Kanaya et al. ............. 399/301 |
| 6,404,448 | B1 * | 6/2002 | Toda .................... 346/116 |
| 6,493,012 | B2 * | 12/2002 | Buch et al. ................. 347/116 |
| 6,501,493 | B2 * | 12/2002 | Fujimoto et al. ............ 347/116 |
| 6,674,982 | B2 | 1/2004 | Saitoh et al. |
| 6,718,151 | B2 | 4/2004 | Kibune et al. |
| 6,816,178 | B2 * | 11/2004 | Yamada et al. .............. 347/116 |
| 6,832,061 | B2 | 12/2004 | Saito et al. |
| 6,839,531 | B2 | 1/2005 | Saitoh et al. |
| 6,842,598 | B2 | 1/2005 | Kibune et al. |
| 6,891,554 | B2 | 5/2005 | Takeyama et al. |
| 2004/0175199 | A1 * | 9/2004 | Yoshizawa .................. 399/75 |
| 2004/0202486 | A1 | 10/2004 | Saitoh et al. |
| 2004/0239745 | A1 | 12/2004 | Takeyama et al. |
| 2004/0258433 | A1 | 12/2004 | Saito et al. |
| 2005/0002686 | A1 | 1/2005 | Saitoh et al. |
| 2005/0030365 | A1 | 2/2005 | Takeyama et al. |
| 2005/0285922 | A1 | 12/2005 | Suzuki et al. |

FOREIGN PATENT DOCUMENTS

| | | |
|---|---|---|
| JP | 2002-031926 | 1/2002 |

* cited by examiner

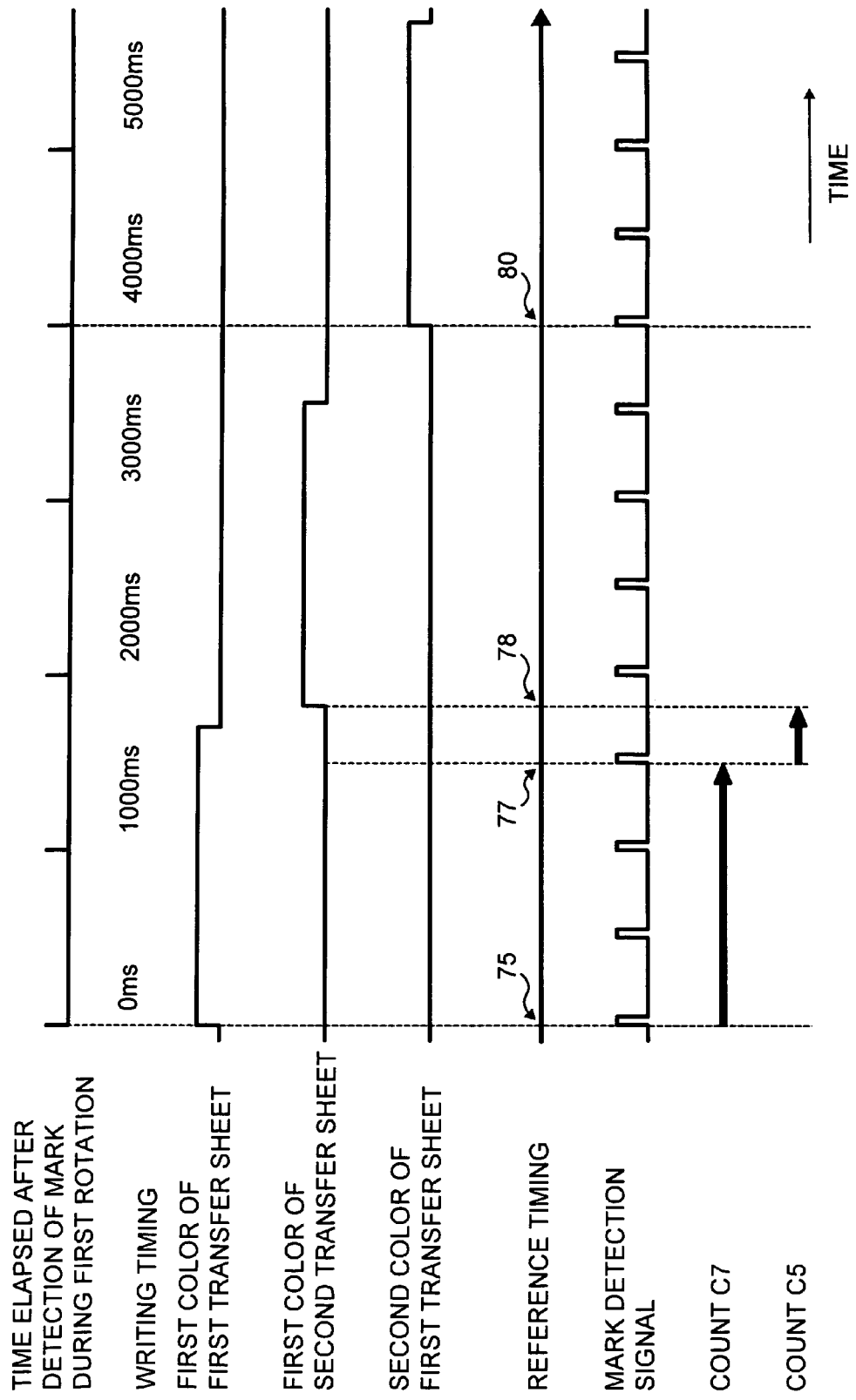

METHOD AND APPARATUS FOR IMAGE FORMING CAPABLE OF SYNTHESIZING A FULL COLOR IMAGE WITHOUT CAUSING DEVIATIONS OF COLOR LAYERS

CROSS-REFERENCE TO RELATED APPLICATIONS

The present application is based on and claims priority to Japanese patent application No. JPAP2004-191795 filed on Jun. 29, 2004 in the Japan Patent Office, the entire contents of which are hereby incorporated herein by reference.

BACKGROUND OF THE INVENTION

1. Field of the Invention

The present invention relates to a method and apparatus for image forming, and more particularly to a method and apparatus for image forming capable of synthesizing a full color image without causing deviations of color layers by adjusting timings for writing color layers.

2. Description of the Related Art

A background color image forming apparatus using an electrophotographic method forms a color toner image by superimposing toner images in four colors (i.e., yellow, magenta, cyan, and black) onto an intermediate transfer member and transferring the superimposed toner images onto a transfer sheet.

A two-station type color image forming apparatus is one example of the background color image forming apparatus, and includes an intermediate transfer member and two image forming units arranged to oppose a moving surface of the intermediate transfer member. Each one of the image forming units is configured to form toner images with two different color toners from among the four colors, and includes an image carrier, an image writer, two development mechanisms, and a switcher. The image writer forms an electrostatic latent image on the image carrier, and the development mechanism visualizes the electrostatic latent image on the image carrier with toner to form a corresponding color toner image. The switcher switches between the two development mechanisms to form two color toner images. The intermediate transfer member is driven to move so as to receive the four color toner images from the two image forming units. Thereby, the four color toner images are transferred and superimposed as a color toner image at a transfer position on a surface of the intermediate transfer member.

In the above-mentioned process, however, if the transfer positions of the four color toner images on the surface of the intermediate transfer member are deviated, the four color toner images are not accurately transferred at a position on the surface of the intermediate transfer member. As a result, an output superimposed color image shows deviations of color image elements and has an inferior image quality. This problematic phenomenon is referred to as a color deviation in the following discussion.

To attempt to eliminate the above color deviation, the color image forming apparatus needs to perform a control operation for starting the transfer of the four color toner images on the surface of the intermediate transfer member at a common start position. Such a control operation is performed typically with a reference mark provided to the intermediate transfer member and a detector for detecting the reference mark. The color image forming apparatus generates sync clock signals and counts a number of sync clock signals generated during a time period after the detector detects the reference mark until the image writer starts writing an electrostatic latent image onto the image carrier. Based on the number of sync clock signals counted, a distance between the reference mark and the position of starting the image transfer on the surface of the intermediate transfer member is determined.

Another control operation for attempting to eliminate the color deviation forms test patterns with respective color toner on the intermediate transfer member, optically detects the test patterns, and determines positional deviations of the test patterns. Based on such positional deviations determined, the positions of images are corrected.

Another control operation for attempting to eliminate the color deviation uses a plurality of reference marks formed on the intermediate transfer member. This attempt measures a time period between detections of two adjacent reference marks and compares it with a predetermined time period to determine whether a time deviation occurs due to variations in load. When the time deviation is determined as occurring, a revolution speed of the image carrier is adjusted to an appropriate speed.

As another example, a tandem type color image forming apparatus includes an intermediate transfer member and four image forming units arranged to oppose a moving surface of the intermediate transfer member and each having at least one reference mark. This apparatus performs a transfer of a first color toner image onto the intermediate transfer member based on a detection of the reference mark and transferring second through fourth color toner images onto the intermediate transfer member based on the number of sync clock signals counted on and after the detection of the reference mark. In this case, the image transfer to the intermediate transfer member is merely repeated for the first through fourth color toner images, regardless of a size or a length of the transfer sheet or a number of prints.

In the two-station type color image forming apparatus, however, the order of transferring in terms of color needs to be changed in accordance with, for example, a number of transfer sheets placed on the intermediate transfer member. This is because a maximum number of transfer sheets placeable on the intermediate transfer member varies depending upon the lengths of the transfer sheets.

Further, the adjacent image forming units in the two-station type color image forming apparatus are arranged with a distance greater than that between the adjacent image forming units in the tandem type color image forming apparatus. Accordingly, the two-station type color image forming apparatus needs to move the intermediate transfer member for a longer distance and that may increase the positional deviation of the superimposed color toner images due to variations in moving speed of the intermediate transfer member.

SUMMARY OF THE INVENTION

According to an aspect of the present invention, an image forming apparatus generates a sync clock signal and produces a color image by forming and superimposing first, second, third, and fourth elementary color toner images sequentially in this order in synchronism with the sync clock signal. The image forming apparatus includes first and second image forming mechanisms, an intermediate transfer member, a mark detection mechanism, a measuring mechanism, and a controller.

The first image forming mechanism selectively forms the first and third elementary color toner images of a specific color image. The second image forming mechanism selectively forms the second and fourth elementary color toner images of the specific color image. The intermediate transfer member includes a reference marking and performs two rotations per one cycle of producing a color image of the first, second, third, and fourth elementary color toner images sequentially superimposed. The mark detection mechanism is arranged close to the reference marking and detects the reference marking on the intermediate transfer member. The measuring mechanism measures a time that elapses after a detection of the reference marking by the mark detection mechanism. The controller instructs the first and second image forming mechanisms to start sequentially and alternately image writing for the first, second, third, and fourth elementary color toner images of the specific color image based on a value measured by the measuring mechanism, a number of image productions, and a number of rotations of the intermediate transfer member.

The first image forming mechanism in a (n+1)th image production is caused to start the image writing for the first elementary color toner image in synchronism with the sync clock signal detected immediately after the detection of the reference marking during a (2*n+1)th rotation of the intermediate transfer member. The first image forming mechanism in the (n+1)th image production is caused to start the image writing for the third elementary color toner image in synchronism with the sync clock signal detected immediately after the detection of the reference marking during a (2*n+2)th rotation of the intermediate transfer member.

The second image forming mechanism in the (n+1)th image production is caused to start the image writing for the second elementary color toner image in synchronism with the sync clock signal detected immediately after a first predetermined elapsed time period measured by the measuring mechanism immediately after the detection of the reference marking during the (2*n+1)th rotation of the intermediate transfer member. The second image forming mechanism in the (n+1)th image production is caused to start the image writing for the fourth elementary color toner image in synchronism with the sync clock signal detected immediately after the first predetermined elapsed time period measured by the measuring mechanism immediately after the detection of the reference marking during the (2*n+2)th rotation of the intermediate transfer member.

The first image forming mechanism in a (k*n+1)th image production is caused to start the image writing for the first elementary color toner image in synchronism with the sync clock signal detected immediately after the detection of the reference marking during the (2*n+1)th rotation of the intermediate transfer member. The first image forming mechanism in the (k*n+1)th image production is caused to start the image writing for the third elementary color toner image in synchronism with the sync clock signal detected immediately after the detection of the reference marking during the (2*n+2)th rotation of the intermediate transfer member.

The first image forming mechanism in a (k*n+p)th image production is caused to start the image writing for the first elementary color toner image in synchronism with the sync clock signal detected immediately after a first predetermined "p"th elapsed time period measured by the measuring mechanism immediately after the detection of the reference marking during the (2*n+1)th rotation of the intermediate transfer member. The first image forming mechanism in the (k*n+p)th image production is caused to start the image writing for the third elementary color toner image in synchronism with the sync clock signal detected immediately after the first predetermined "p"th elapsed time period measured by the measuring mechanism immediately after the detection of the reference marking during the (2*n+2)th rotation of the intermediate transfer member.

The second image forming mechanism in the (k*n+1)th image production is caused to start the image writing for the second elementary color toner image in synchronism with the sync clock signal detected immediately after a second predetermined elapsed time period measured by the measuring mechanism immediately after the detection of the reference marking during the (2*n+1)th rotation of the intermediate transfer member. The second image forming mechanism in the (k*n+1)th image production is caused to start the image writing for the fourth elementary color toner image in synchronism with the sync clock signal detected immediately after the second predetermined elapsed time period measured by the measuring mechanism immediately after the detection of the reference marking during the (2*n+2)th rotation of the intermediate transfer member.

The second image forming mechanism in the (k*n+p)th image production is caused to start the image writing for the second elementary color toner image in synchronism with the sync clock signal detected immediately after a second predetermined "p"th elapsed time period measured by the measuring mechanism immediately after the detection of the reference marking during the (2*n+1)th rotation of the intermediate transfer member. The second image forming mechanism in the (k*n+p)th image production is caused to start the image writing for the fourth elementary color toner image in synchronism with the sync clock signal detected immediately after the second predetermined "p"th elapsed time period measured by the measuring mechanism immediately after the detection of the reference marking during the (2*n+2)th rotation of the intermediate transfer member.

"k" is a positive integer equal to or greater than 2 and indicates a number of image productions executed per two rotations of the intermediate transfer member. "*" is a multiplication sign. "n" is a positive integer satisfying $n \leq 0$ and n+1=m when "m" is the number of rotations of the intermediate transfer member. "p" is a positive integer variant satisfying $2 \leq p \geq k$ and identifies the number of image productions.

The present invention is also directed to corresponding image forming methods.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein:

FIG. 11 is a timing chart illustrating timings for an image writing operation performed by the image forming apparatus of FIG. 10.

DETAILED DESCRIPTION OF THE PREFERRED EMBODIMENTS

Figure 1:
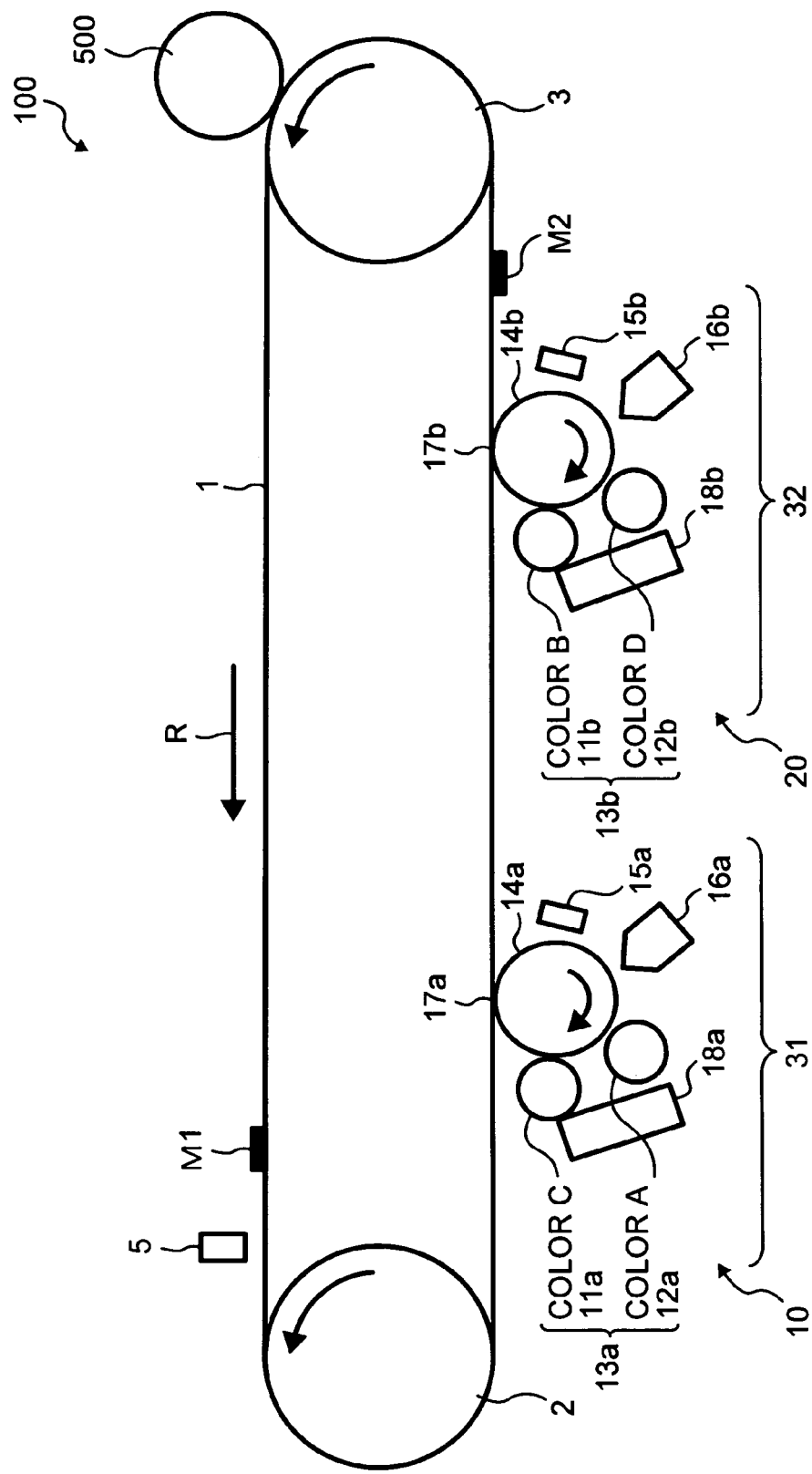
FIG. 1 is an illustration illustrating an image forming apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1 to 3, an image forming apparatus according to an exemplary embodiment of the present invention is explained.

As illustrated in FIG. 1, an image forming apparatus 100 includes an intermediate transfer member 1, a driving roller 2, a driven roller 3, a sensor 5, image stations 31 and 32, and a transfer element 500.

The intermediate transfer member 1 includes marks M1 and M2. The image station 31 includes a first image forming unit 10. The image station 32 includes a second image forming unit 20.

The first image forming unit 10 includes a photoconductive drum 14a, a charger 15a, an image writer 16a, a development unit 13a, and a switcher 18a. The second image forming unit 20 includes a photoconductive drum 14b, a charger 15b, an image writer 16b, a development unit 13b, and a switcher 18b.

The development unit 13a includes development rollers 11a and 12a. The development unit 13b includes development rollers 11b and 12b.

The intermediate transfer member 1 is configured to be formed of an endless belt onto which toner images formed on the photoconductive drums 14a and 14b are transferred, and that rotates in a rotating direction R. The driving roller 2 and the driven roller 3 are configured to support the intermediate transfer member 1. The sensor 5 is configured to detect the marks M1 and M2. The image stations 31 and 32 are configured to have a common structure and to be arranged along a common moving surface of the intermediated transfer member 1 in a manner that a predetermined distance is provided in between. The transfer element 500 is configured to transfer a color toner image formed on the intermediate transfer member 1 onto a transfer sheet.

The marks M1 and M2 are configured to form reference marks for detecting a position on the intermediate transfer member 1. The first image forming unit 10 is configured to include parts for forming an image such as the photoconductive drum 14a, the charger 15a, the image writer 16a, and the development unit 13a. The second image forming unit 20 is configured to include parts for forming an image such as the photoconductive drum 14b, the charger 15b, the image writer 16b, and the development unit 13b.

The photoconductive drums 14a and 14b are configured to function as image carriers on which electrostatic latent images are formed. The charger 15a is configured to uniformly charge the photoconductive drum 14a. The charger 15b is configured to uniformly charge the photoconductive drum 14b. The image writer 16a is configured to write an electrostatic latent image onto the photoconductive drum 14a. The image writer 16b is configured to write an electrostatic latent image onto the photoconductive drum 14b. The development unit 13a is configured to include the development rollers 11a and 12a. The development unit 13b is configured to include the development rollers 11b and 12b. The switcher 18a is configured to selectively drive one of the development rollers 11a and 12a. The switcher 18b is configured to selectively drive one of the development rollers 11b and 12b.

The development rollers 11a and 12a are configured to visualize electrostatic latent images formed on the photoconductive drum 14a with toner. The development rollers 11b and 12b are configured to visualize electrostatic latent images formed on the photoconductive drum 14b with toner.

The development rollers 11a and 12a are arranged on a perimeter of the photoconductive drum 14a to oppose the photoconductive drum 14a in a manner that the development roller 11a is adjacent to the development roller 12a. The development rollers 11b and 12b are arranged on a perimeter of the photoconductive drum 14b to oppose the photoconductive drum 14b in a manner that the development roller 11b is adjacent to the development roller 12b.

The switcher 18a selectively drives one of the development rollers 11a and 12a. The switcher 18b selectively drives one of the development rollers 11b and 12b. For example, swing arms (not shown) support the development rollers 11a and 12a in a manner that the development rollers 11a and 12a swing to contact and separate from the photoconductive drum 14a. Other swing arms (not shown) support the development rollers 11b and 12b in a manner that the development rollers 11b and 12b swing to contact and separate from the photoconductive drum 14b.

The mark M1 is arranged on one edge in a width direction being perpendicular to the rotating direction R on a surface of the intermediate transfer member 1. The mark M1 is formed along the rotating direction R and functions as a reference mark on the intermediate transfer member 1. In FIG. 1, two marks, that is, the marks M1 and M2, are arranged. Above a route along which the marks M1 and M2 pass through, an immobile member (not shown) fixes the sensor 5. The sensor 5 includes a light emitter (not shown) and a light receiver (not shown).

Image forming processes in each of the image stations 31 and 32 are performed by a general electrostatic recording method. In the image station 31, the charger 15a uniformly charges the photoconductive drum 14a in the dark. The image writer 16a writes an electrostatic latent image for a certain color onto the photoconductive drum 14a. One of the development rollers 11a and 12a visualizes the electrostatic latent image with toner. The visualized toner image is transferred onto the intermediate transfer member 1. In the image station 32, similar image forming processes are performed.

In the image station 31, the development roller 12a visualizes the electrostatic latent image with toner in color A, and the development roller 11a visualizes the electrostatic latent image with toner in color C. In the image station 32, the development roller 12b visualizes the electrostatic latent image with toner in color D, and the development roller 11b visualizes the electrostatic latent image with toner in color B. If the four development rollers 11a, 12a, 11b, and 12b handle four different colors, that is, three primary colors plus black color, a full-color image can be formed.

While a common image forming area on the intermediate transfer member 1 passes the image stations 31 and 32, the image station 31 transferring a toner image in any one of the colors A and C onto the intermediate transfer member 1 at a transfer position 17a. The image station 32 transferring and superimposes a toner image in any one of the colors D and B onto the intermediate transfer member 1 at a transfer position 17b. While the common image forming area on the intermediate transfer member 1 passes again the image stations 31 and 32, each of the image stations 31 and 32 transferring and superimposes a toner image in a color other than that used before. Thus, when the common image forming area has passed the image stations 31 and 32 twice, a full-color toner image is transferred. When the full-color toner image is transferred onto a transfer sheet, a full-color image is formed on the transfer sheet. A fixing unit (not shown) fixes the full-color image on the transfer sheet. Thus, the finished full-color image is formed on the transfer sheet.

As described above, toner images in at least three primary colors, that is, the colors A, B, and C, are transferred onto the intermediate transfer member 1. The two image stations 31 and 32 are arranged along the common moving surface of the intermediate transfer member 1 moving in the rotating direction R in a manner that a predetermined distance is provided between the image stations 31 and 32. Each of the first image forming unit 10 and the second image forming unit 20 transferring a toner image onto the intermediate transfer member 1. The transfer element 500 transfers a color toner image formed on the intermediate transfer member 1 onto a transfer sheet.

Figure 2:
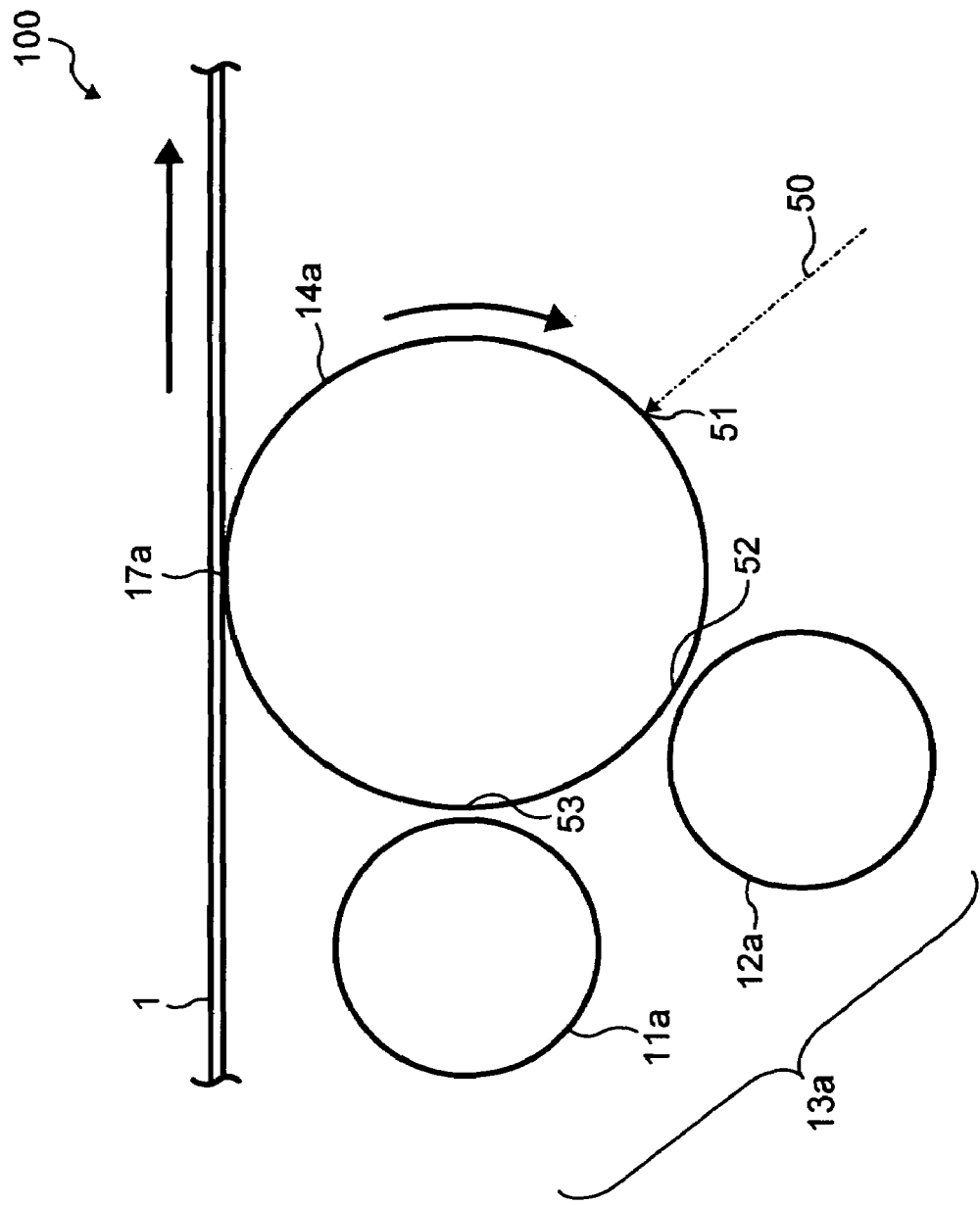
FIG. 2 is an illustration illustrating a writing start position, development positions, and a transfer position on a photoconductive drum of the image forming apparatus shown in FIG. 1.

In FIG. 2, a reference numeral 50 denotes a scanning light. A reference numeral 51 denotes a writing start position. Reference numerals 52 and 53 denote development positions. A reference numeral 17a denotes a transfer position.

In the image station 31, the image writer 16a emits the scanning light 50 to start writing an electrostatic latent image at the writing start position 51 on the photoconductive drum 14a. The development roller 12a visualizes the electrostatic latent image with toner in the color A at the development position 52 on the photoconductive drum 14a. The development roller 11a visualizes the electrostatic latent image with toner in the color C at the development position 53. The visualized toner image is transferred onto the intermediate transfer member 1 at the transfer position 17a on the photoconductive drum 14a. In the image station 32, similar processes are performed.

Figure 3:
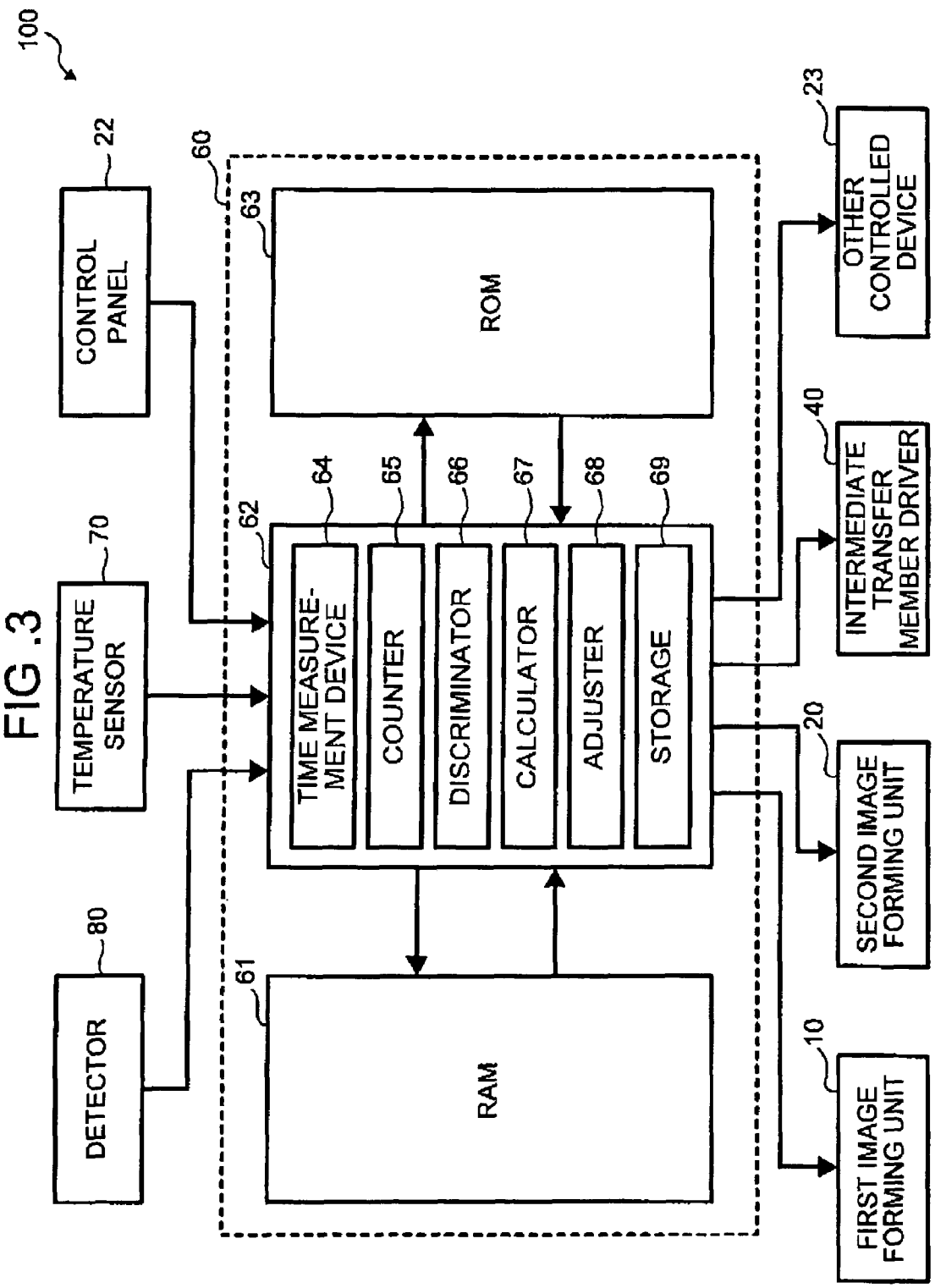
FIG. 3 is a block diagram of a controller of the image forming apparatus shown in FIG. 1.

As illustrated in FIG. 3, the image forming apparatus 100 further includes a controller 60, a control panel 22, a detector 80, a temperature sensor 70, an intermediate transfer member driver 40, and other controlled device 23. The controller 60 includes a CPU (central processing unit) 62, a RAM (random access memory) 61, and a ROM (read only memory) 63.

The CPU 62 includes a time measurement device 64, a counter 65, a discriminator 66, a calculator 67, an adjuster 68, and a storage 69.

The controller 60 is configured to control operations of the image forming apparatus 100. The control panel 22 is configured to include operation keys with which a user sets image forming conditions of the image forming apparatus 100. The detector 80 is configured to include the sensor 5. The temperature sensor 70 is configured to detect an environmental temperature. The intermediate transfer member driver 40 is configured to drive the intermediate transfer member 1. The other controlled device 23 is configured to include a device controlled by the controller 60. The CPU 62 is configured to perform operations necessary to control the image forming apparatus 100. The RAM 61 and the ROM 63 are configured to store information necessary to control operations of the image forming apparatus 100.

The time measurement device 64 is configured to measure a time period elapsed after the sensor 5 detects one of the marks M1 and M2. The counter 65 is configured to count sync clock signals. The discriminator 66 is configured to discriminate a length of a transfer sheet in a sheet conveyance direction. The calculator 67 is configured to calculate the writing start position 51 based on a moving speed of the intermediate transfer member 1. The adjuster 68 is configured to change a first reference count based on an environmental temperature, a number of prints, and a time period of usage. The storage 69 is configured to store the first reference count.

The controller 60 receives information sent from the control panel 22, the detector 80, and the temperature sensor 70, and outputs control information necessary to form an image to the first image forming unit 10, the second image forming unit 20, the intermediate transfer member driver 40, and the other controlled device 23.

Image forming processes according to the present embodiment are explained below. When the intermediate transfer member 1 has a perimeter indicated by "L", a transfer sheet has a length in the rotating direction R indicated by "M", and the intermediate transfer member 1 has a length of a non-image forming area in the rotating direction R indicated by "Q", color image forming processes in a case of L=M+Q are explained below. "Q" is shorter than "M". A value of "Q" varies depending on a length of the image forming area on the intermediate transfer member 1 or a length of the transfer sheet used. Therefore, "Q" may be longer than "M" depending on the length of the transfer sheet.

In step 1, the first image station 31 transferring a toner image in the color A (i.e., a first color) onto the intermediate transfer member 1.

In step 2, the second image station 32 transferring and superimposes a toner image in the color B (i.e., a second color) onto the toner image in the color A, so that a toner image in the colors A and B is formed. Then, the first image station 31 transferring and superimposes a toner image in the color C (i.e., a third color) onto the toner image in the colors A and B, so that a toner image in the colors A, B, and C is formed. At this moment, the intermediate transfer member 1 has rotated for approximately one cycle.

In step 3, the second image station 32 transferring and superimposes a toner image in the color D (i.e., a fourth color) onto the toner image in the colors A, B, and C formed in step 2, so that a full-color toner image is formed. The transfer element 500 transfers the full-color toner image onto a transfer sheet (i.e., a first transfer sheet) during a second rotation of the intermediate transfer member 1.

In step 4, to produce a second color print, the first image station 31 transferring a toner image in the color A while the second image station 32 transferring and superimposes the toner image in the color D onto the toner image in the colors A, B, and C in step 3. Then, the second image station 32 transferring and superimposes a toner image in the color B onto the toner image in the color A, so that a toner image in the colors A and B is formed.

In step 5, the first image station 31 transferring and superimposes a toner image in the color C onto the toner image in the colors A and B formed in step 4, so that a toner image in the colors A, B, and C is formed. Then, the second image station 32 transferring and superimposes a toner image in the color D onto the toner image in the colors A, B, and C, so that a full-color toner image is formed. The transfer element 500 transfers the full-color toner image onto a transfer sheet (i.e., a second transfer sheet) during a fourth rotation of the intermediate transfer member 1.

In step 6, to produce third and subsequent color prints, processes in steps 3 to 5 are repeated. The third color print is produced during a sixth rotation of the intermediate transfer member 1.

Writing timings using the intermediate transfer member 1 on one perimeter of which up to two A4-size transfer sheets can be placed in line are explained below with reference to FIGS. 4 and 5.

Figure 4:
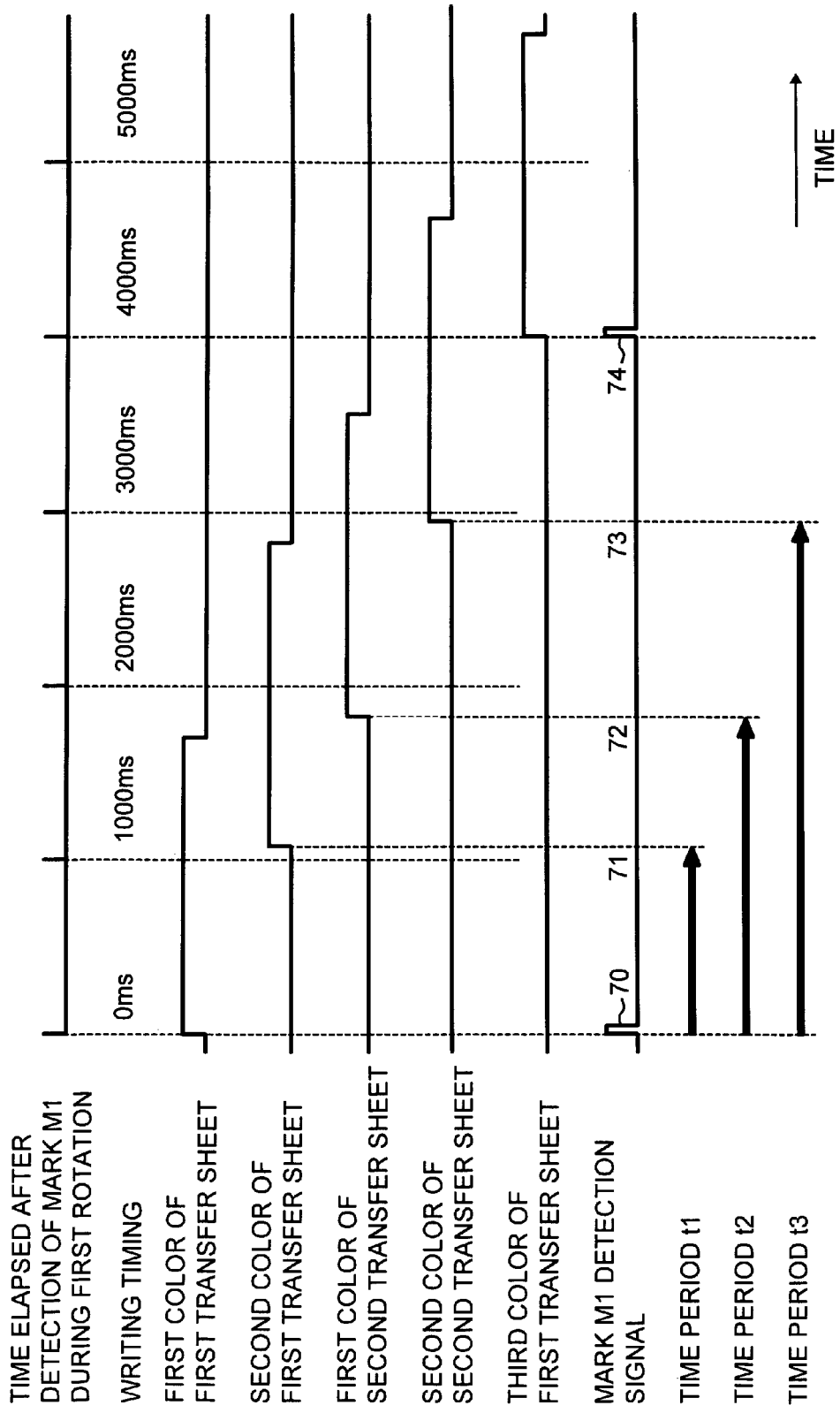
FIG. 4 is a timing chart illustrating timings for an image writing operation performed by the image forming apparatus of FIG. 1.
Figure 5:
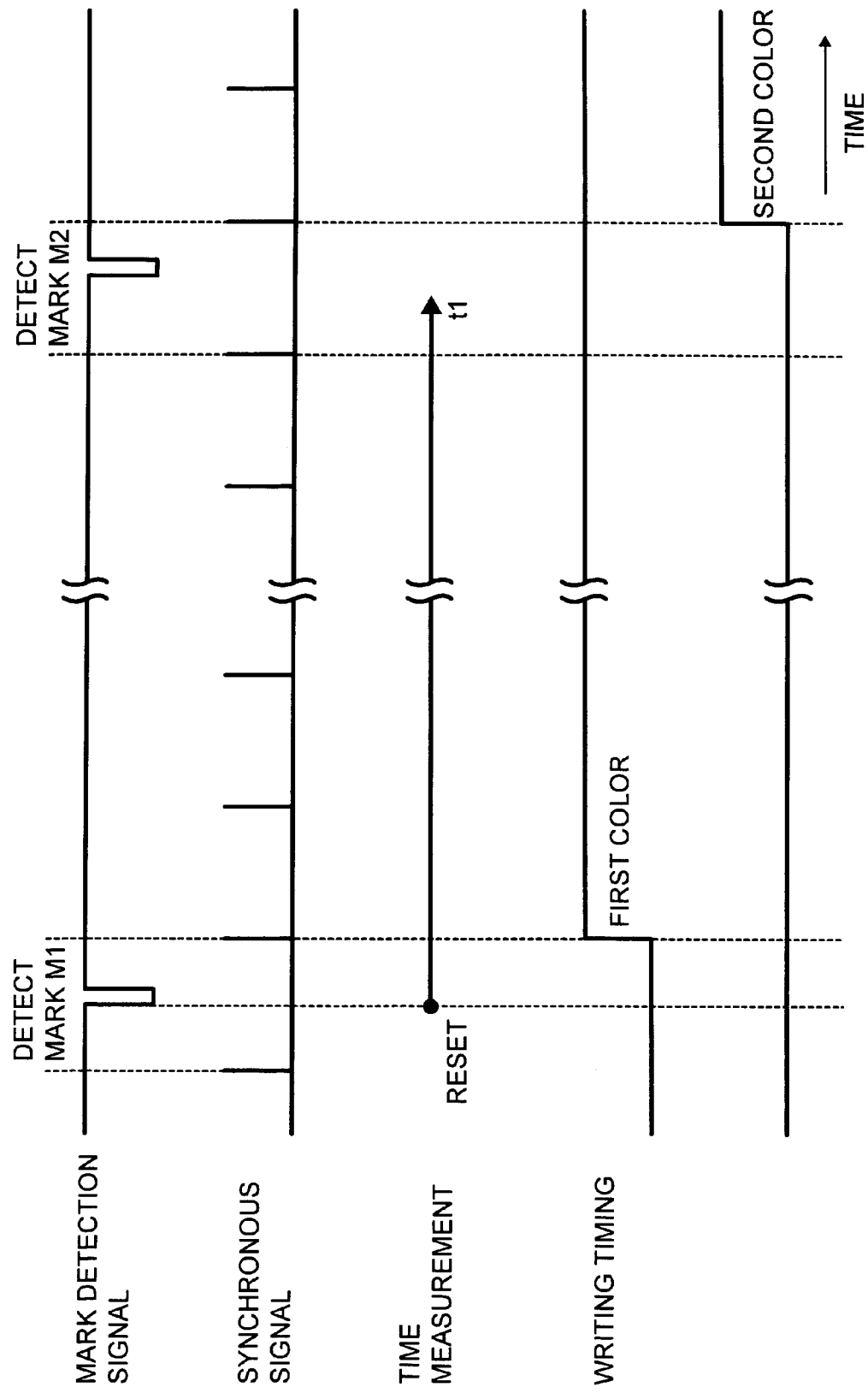
FIG. 5 is a timing chart illustrating timings for the image writing operation in a larger scale.

When the sensor 5 arranged in an upstream side of the image station 31 in the rotating direction R detects the mark M1, the image writer 16a starts writing for the first color (for example, the color A) of the first transfer sheet at timing shown with a reference number 70 in FIG. 4 in synchronism with a sync clock signal of the image writer 16a output immediately after the sensor 5 detects the mark M1.

The above writing timing is explained in detail with reference to FIG. 5. When the sensor 5 detects the mark M1, a mark detection signal is output. The sync clock signal of the image writer 16a is generated in a main scanning direction writing line cycle. The mark detection signal is asynchronous to the sync clock signal of the image writer 16a. Writing for each line starts in synchronism with the sync clock signal of the image writer 16a. Therefore, writing for the first color starts in synchronism with the sync clock signal of the image writer 16a output immediately after the sensor 5 detects the mark M1.

When the mark detection signal is output, the time measurement device 64 is reset to newly start measuring an elapsed time. Writing for the second color starts in synchronism with the sync clock signal of the image writer 16b output immediately after a predetermined first time period t1 elapses. Namely, the image writer 16b starts writing for the second color (for example, the color B) of the first transfer sheet at the timing shown with a reference number 71 in FIG. 4 after a time period t1 shown in FIG. 4 elapses. The time period t1 is equivalent to a time period required for the intermediate transfer member 1 to move a distance from the transfer position 17a to the transfer position 17b. The time measurement device 64 measures the time period t1.

Subsequently, the image writer 16a starts writing for the first color of the second transfer sheet at the timing shown with a reference number 72 in FIG. 4 after a time period t2 shown in FIG. 4 elapses. The time period t2 is equivalent to a time period required for the intermediate transfer member 1 to move a distance equal to the length of the transfer sheet plus a space between the transfer sheets in the sheet conveyance direction, that is, the rotating direction R, after the sensor 5 detects the mark M1.

Subsequently, the image writer 16b starts writing for the second color of the second transfer sheet at the timing shown with a reference number 73 in FIG. 4 after a time period t3 shown in FIG. 4 elapses. The time period t3 is equivalent to a time period required for the intermediate transfer member 1 to move a distance from the transfer position 17a to the transfer position 17b plus the time period t2.

When the sensor 5 detects the mark M1 which has rotated for one cycle of the intermediate transfer member 1, the image writer 16a starts writing for the third color (for example, the color C) of the first transfer sheet at the timing shown with a reference number 74 in FIG. 4, in a common manner as in a first rotation. Subsequently, writing for the fourth color (for example, the color D) of the first transfer sheet, the third color of the second transfer sheet, and the fourth color of the second transfer sheet is similarly performed.

In an example, as the first writing, the image writer 16a starts writing for the first color of a (k*n+1)th transfer sheet in synchronism with the sync clock signal of the image writer 16a output immediately after the sensor 5 detects the mark M1 during a (2*n+1)th rotation of the intermediate transfer member 1. "k" indicates the number of the transfer sheets printed while the intermediate transfer member 1 rotates for two cycles. "k" is an integer not smaller than one. "*" is a multiplication sign. "n" is an integer not smaller than zero. A value of "k" may be determined based on a relationship between the perimeter of the intermediate transfer member 1 and the length of the transfer sheet.

The image writer 16a starts writing for the third color of the (k*n+1)th transfer sheet in synchronism with the sync clock signal of the image writer 16a output immediately after the sensor 5 detects the mark M1 during a (2*n+2)th rotation of the intermediate transfer member 1.

As the second writing, the image writers 16a and 16b start writing for the second color of the (k*n+1)th transfer sheet and the first color and the second color of a (k*n+p)th transfer sheet in synchronism with the sync clock signals of the image writers 16a and 16b output immediately after the predetermined first time period t1 and the predetermined second time period tp respectively elapse after the sensor 5 detects the mark M1 during the (2*n+1)th rotation of the intermediate transfer member 1. The image writers 16a and 16b start writing for the fourth color of the (k*n+1)th transfer sheet and the third color and the fourth color of the (k*n+p)th transfer sheet in synchronism with the sync clock signals of the image writers 16a and 16b output immediately after the predetermined first time period t1 and the predetermined second time period tp respectively elapse after the sensor 5 detects the mark M1 during the (2*n+2)th rotation of the intermediate transfer member 1. "p" is an integer not smaller than two but not greater than "k" when "k" is an integer not smaller than two. Thus, in the image forming apparatus 100 including the two image stations 31 and 32, it is possible to decrease deviation in foremost edges of transferred images under image writing conditions for printing images onto the transfer sheets of various sizes at a high speed.

A variable "p" is defined for the (k*n+p)th transfer sheet, the second time period tp, and a second count Cp (described later) as an integer not smaller than two but not greater than "k" when "k" is an integer not smaller than two. Table 1 shows an example of writing timings when three transfer sheets are placed per one perimeter of the intermediate transfer member 1 (i.e., k=3).

TABLE 1

| Number of rotations of the intermediate transfer member 1 | First writing k*n + 1 | Second writing | |
|---|---|---|---|
| | | k*n + p | Value of k*n + p |
| 0 | 1 | 1 | p | 2 (p = 2) |
| | | | | 3 (p = 3) |
| 1 | 2 | 4 | p + 3 | 5 (p = 2) |
| | | | | 6 (p = 3) |
| 2 | 3 | 7 | p + 6 | 8 (p = 2) |
| | | | | 9 (p = 3) |
| 3 | 4 | 10 | p + 9 | 11 (p = 2) |
| | | | | 12 (p = 3) |

When "n" is zero, that is, during the first rotation of the intermediate transfer member 1, the second writing is performed for a "p"th transfer sheet (i.e., p=2 or 3). Electrostatic latent images formed by the second writing are for toner images in the second color of the (k*n+1)th transfer sheet, that is, the second color of the first transfer sheet, the first color and the second color of the second transfer sheet, and the first color and the second color of the third transfer sheet. The first color and the second color of the second transfer sheet and the first color and the second color of the third transfer sheet satisfy a condition k*n+p. When one transfer sheet is placed per one perimeter of the intermediate transfer member 1 (i.e., k=1), the condition k*n+p is not satisfied. Therefore, an electrostatic latent image formed by the second writing is for a toner image in the second color of the (k*n+1)th transfer sheet, that is, the second color of the first transfer sheet. The second time period tp and the second count Cp are not applicable.

Another embodiment of the present invention is explained below with reference to FIG. 6. The structure of the image forming apparatus 100 and the image forming processes according to the previous embodiment are applied to the present embodiment.

The present embodiment uses the intermediate transfer member 1 on one perimeter of which up to two A4-size transfer sheets can be placed in line.

When the sensor 5 detects the mark M1, the image writer 16*a* starts writing for the first color of the first transfer sheet at the timing shown with the reference number 70 in synchronism with the sync clock signal of the image writer 16*a* output immediately after the sensor 5 detects the mark M1.

The image writer 16*b* starts writing for the second color of the first transfer sheet at the timing shown with the reference number 71 after a count C1 elapses. The count C1 is equivalent to a time period required for the intermediate transfer member 1 to move the distance from the transfer position 17*a* to the transfer position 17*b*. The count C1 is obtained by counting the sync clock signals.

Subsequently, the image writer 16*a* starts writing for the first color of the second transfer sheet at the timing shown with the reference number 72 after a count C2 elapses. The count C2 is equivalent to a time period required for the intermediate transfer member 1 to move the distance equal to the length of the transfer sheet plus a space between the transfer sheets in the sheet conveyance direction, that is, the rotating direction R after the sensor 5 detects the mark M1. The count C2 is obtained by counting the sync clock signals.

Subsequently, the image writer 16*b* starts writing for the second color of the second transfer sheet at the timing shown with the reference number 73 after a count C3 elapses. The count C3 is equivalent to a time period required for the intermediate transfer member 1 to move the distance from the transfer position 17*a* to the transfer position 17*b* plus the count C2. The count C3 is obtained by counting the sync clock signals.

When the sensor 5 detects the mark M1 which has rotated for one cycle, the image writer 16*a* starts writing for the third color of the first transfer sheet at the timing shown with the reference number 74, in a common manner as in the first rotation. Subsequently, writing for the fourth color of the first transfer sheet, the third color of the second transfer sheet, and the fourth color of the second transfer sheet is similarly performed.

In another example, as the second writing, the image writers 16*a* and 16*b* start writing for the second color of the (k*n+1)th transfer sheet and the first color and the second color of the (k*n+p)th transfer sheet when counts of the sync clock signals counted by the counter 65 based on the sync clock signal output immediately after the sensor 5 detects the mark M1 during the (2*n+1)th rotation of the intermediate transfer member 1 respectively match with the predetermined first count C1 and the predetermined second count Cp. The image writers 16*a* and 16*b* start writing for the fourth color of the (k*n+1)th transfer sheet and the third color and the fourth color of the (k*n+p)th transfer sheet when counts of the sync clock signals counted by the counter 65 based on the sync clock signal output immediately after the sensor 5 detects the mark M1 during the (2*n+2)th rotation of the intermediate transfer member 1 respectively match with the predetermined first count C1 and the predetermined second count Cp. "p" is an integer not smaller than two but not greater than "k" when "k" is an integer not smaller than two.

Thus, in the image forming apparatus 100 including the two image stations 31 and 32, it is possible to decrease deviation in foremost edges of transferred images under image writing conditions for printing images onto the transfer sheets of various sizes at a high speed.

Another embodiment of the present invention is explained below with reference to FIGS. 7, 8, and 9. The structure of the image forming apparatus 100 and the image forming processes according to the preceding embodiment are applied to the present embodiment.

The present embodiment uses the intermediate transfer member 1 on one perimeter of which up to two A4-size transfer sheets can be placed in line.

Figure 7:
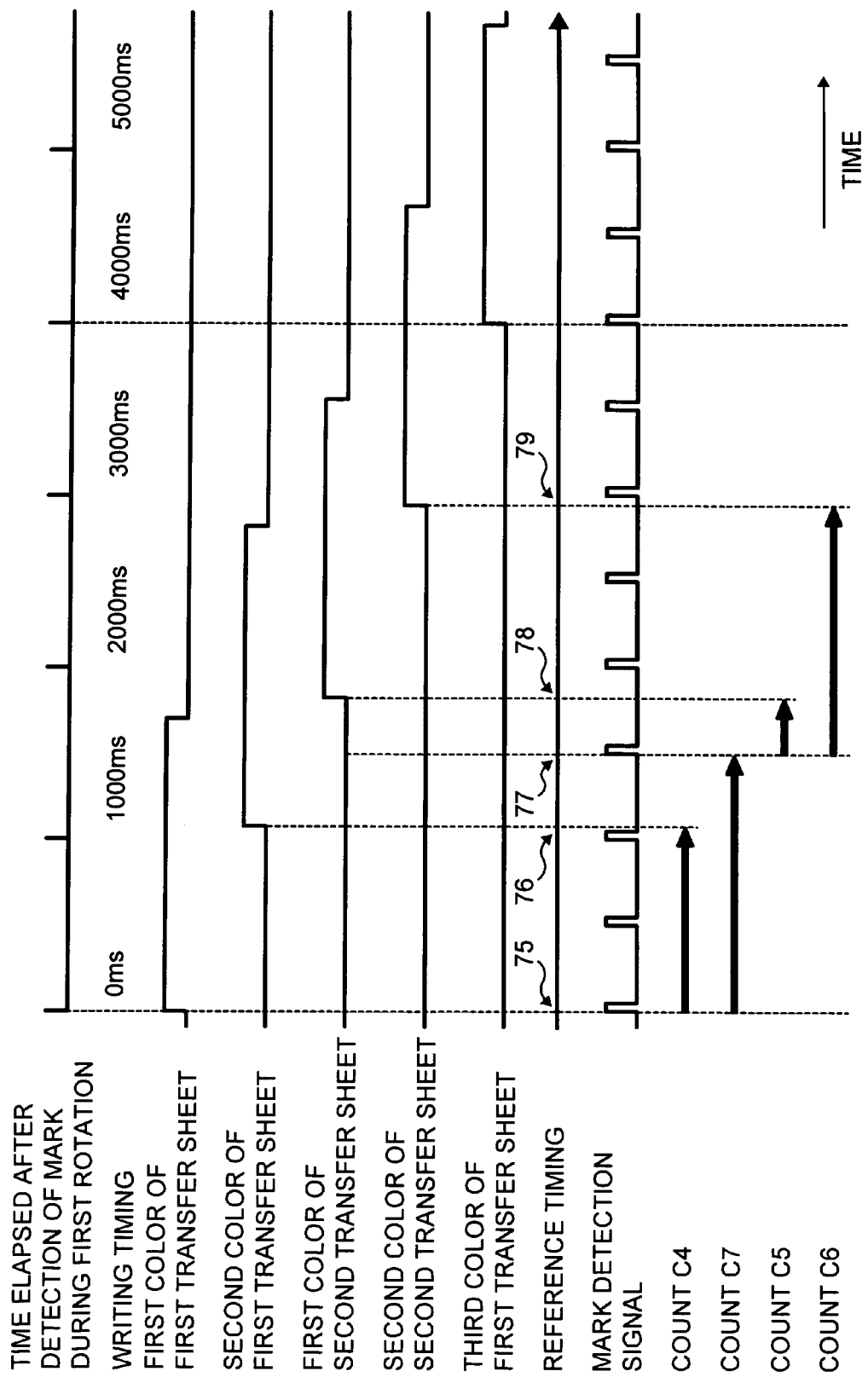
FIG. 7 is a timing chart illustrating timings for another image writing operation performed by the image forming apparatus of FIG. 1.

When the sensor 5 detects the mark M1, the image writer 16*a* starts writing for the first color of the first transfer sheet at the timing shown with a reference number 75 in FIG. 7 in synchronism with the sync clock signal of the image writer 16*a* output immediately after the sensor 5 detects the mark M1.

The image writer 16*b* starts writing for the second color of the first transfer sheet at the timing shown with a reference number 76 in FIG. 7 after a count C4 shown in FIG. 7 elapses. The count C4 is equivalent to a time period required for the intermediate transfer member 1 to move the distance from the transfer position 17*a* to the transfer position 17*b*. The count C4 is obtained by counting the sync clock signals.

Figure 8:
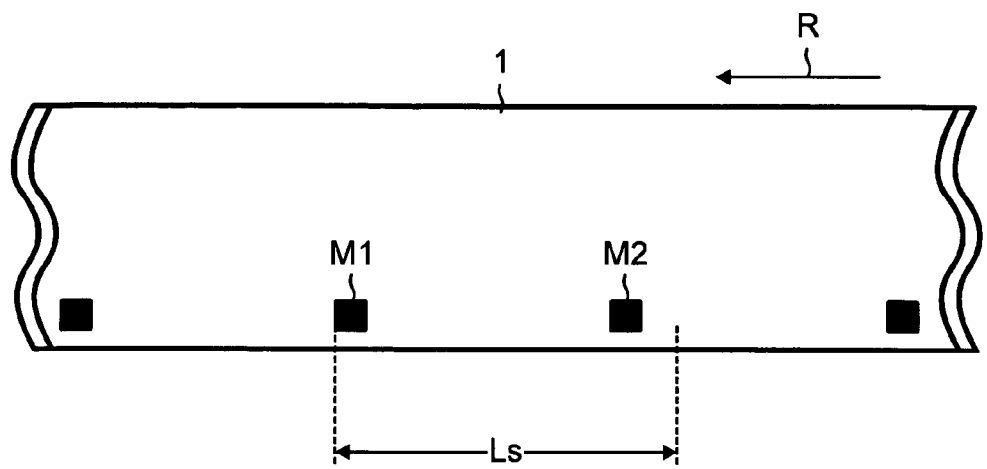
FIG. 8 is an illustration illustrating arrangement of reference marks provided to an intermediate transfer member of the image forming apparatus of FIG. 1.
Figure 9:
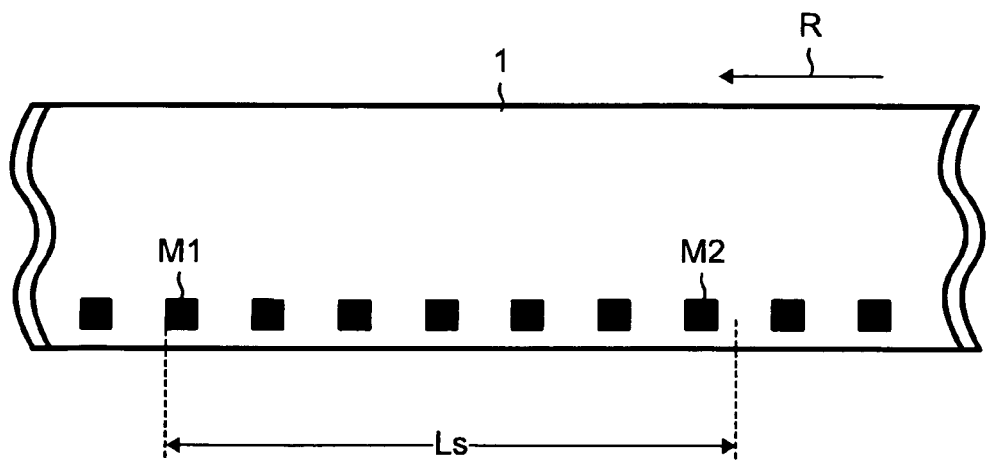
FIG. 9 is an illustration illustrating another arrangement of the reference marks.

The timing shown with a reference number 77 in FIG. 7 after a count C7 shown in FIG. 7 elapses is referred to as the timing when the sensor 5 detects the mark M2 illustrated in FIGS. 8 and 9 immediately before the timing shown with a reference number 78 in FIG. 7. The timing shown with the reference number 78 is equivalent to a time period required for the intermediate transfer member 1 to move the distance equal to the length of the transfer sheet plus a space between the transfer sheets in the sheet conveyance direction, that is, the rotating direction R, after the sensor 5 detects the mark M1. In FIGS. 8 and 9, a distance Ls is equivalent to the distance equal to the length of the transfer sheet plus a space between the transfer sheets in the sheet conveyance direction.

The image writer 16*a* starts writing for the first color of the second transfer sheet at the timing shown with the reference number 78 after a count C5 shown in FIG. 7 elapses. The count C5 is equivalent to a time period from the timing shown with the reference number 77 until the timing shown with the reference number 78. The count C5 is obtained by counting the sync clock signals.

Subsequently, the image writer 16*b* starts writing for the second color of the second transfer sheet at the timing shown with a reference number 79 in FIG. 7 after a count C6 shown in FIG. 7 elapses. The count C6 is obtained by counting the sync clock signals. After the sensor 5 detects the mark M1 which has rotated for one cycle of the intermediate transfer member 1, the image writers 16*a* and 16*b* start writing for the third color of the first transfer sheet, the fourth color of the first transfer sheet, the third color of the second transfer sheet, and the fourth color of the second transfer sheet in a common manner as in the first rotation.

According to the present embodiment, writing for the third color of the second transfer sheet starts by using the common mark M2 which has rotated for one cycle of the intermediate transfer member 1 after being used in writing for the first color of the second transfer sheet. Thus, it is possible to improve accuracy in correcting image deviation as is in writing for the first transfer sheet. Moreover, writing for the second color and the fourth color of the second transfer sheet starts at a timing when a shorter time period elapses after the sensor 5 detects the mark M2. Thus, even if a moving speed of the intermediate transfer member 1 changes, it is possible to decrease deviation in foremost edges of transferred images.

In another example, a plurality of marks used as reference marks are evenly spaced on the intermediate transfer member 1. As the second writing, one of the plurality of marks is detected immediately before writing starts. The sync clock signal output immediately after the mark is detected becomes a reference. Timings to start writing for the first color and the second color of the (k*n+p)th transfer sheet during the (2*n+1)th rotation of the intermediate transfer member 1 are controlled with counts of the sync clock signals counted by the counter 65 based on the reference. The counts vary depending on the length of the transfer sheet and a space between the transfer sheets. Timings to start writing for the third color and the fourth color of the (k*n+p)th transfer sheet during the (2*n+2)th rotation of the intermediate transfer member 1 are controlled with counts of the sync clock signals counted by the counter 65 based on the reference.

As described above, when two or more transfer sheets are placed per one perimeter of the intermediate transfer member 1, writing for the second or subsequent transfer sheet starts by using a mark detected immediately before writing starts as the reference mark. Therefore, a shorter time period may elapse from detection of the mark until start of writing. Thus, even if a moving speed of the intermediate transfer member 1 changes, it is possible to decrease deviation in foremost edges of transferred images.

Another embodiment of the present invention is explained below with reference to FIG. 7. The structure of the image forming apparatus 100 and the image forming processes according to the preceding embodiment are applied to the present embodiment.

When the sensor 5 detects a mark formed on the intermediate transfer member 1, the image writer 16a starts writing for the first color of the first transfer sheet at the timing shown with the reference number 75 in synchronism with the sync clock signal of the image writer 16a output immediately after the sensor 5 detects the mark.

The mark indicates a mark that is first detected among the plurality of marks formed on the intermediate transfer member 1 after the marks wait for being detected so that writing starts at a timing specified by a sequence. The mark is indicated as the mark M1.

Subsequently, the image writer 16b starts writing for the second color of the first transfer sheet at the timing shown with the reference number 76 after the count C4 elapses.

The plurality of marks are detected between the timings shown with the reference numbers 75 and 76. A count obtained by counting the sync clock signals output from the time when a mark is detected immediately after the timing shown with the reference number 75 until the time when another mark is detected immediately before the timing shown with the reference number 76 is set in advance based on past data. The count is compared with a count obtained by counting the sync clock signals while printing is performed from the time when a mark is detected immediately after the timing shown with the reference number 75 until the time when another mark is detected immediately before the timing shown with the reference number 76.

If there is any change in a moving speed of the intermediate transfer member 1, a difference occurs between the above counts that are compared. The count C4 is corrected to settle the difference, so that writing starts from a proper position.

In another example, as the second writing, the counter 65 counts the sync clock signals output from the time when the sensor 5 detects a mark used for the first writing until the time when the sensor 5 detects another mark immediately before writing starts. A predetermined count C0 is subtracted from a count Cx, which is counted as described above, to obtain a difference D. The difference D is added to the first count C1 and the second count Cp. Thus, even if a moving speed of the intermediate transfer member 1 changes, it is possible to decrease deviation in foremost edges of transferred images.

Another embodiment of the present invention is explained below with reference to FIG. 7. The structure of the image forming apparatus 100 and the image forming processes according to the preceding embodiment are applied to the present embodiment.

Writing for the first color of the first transfer sheet starts at the timing shown with the reference number 75 in synchronism with the sync clock signal output immediately after the sensor 5 detects a mark. Writing for the first color of the second transfer sheet starts at the timing shown with the reference number 78 in synchronism with the sync clock signal output after the count C5 elapses.

Writing for the third color of the first transfer sheet starts in synchronism with the sync clock signal output immediately after the sensor 5 detects the common mark used for writing for the first color of the first transfer sheet, after the intermediate transfer member 1 has rotated for one cycle. Thus, writing for the third color of the first transfer sheet may be performed without causing deviation in foremost edges of transferred images. Therefore, even if a moving speed of the intermediate transfer member 1 changes, it is possible to decrease deviation in foremost edges of transferred images when writing starts as soon as possible after the sensor 5 detects the mark.

Writing for the first color of the first transfer sheet and the first color of the second transfer sheet is adjusted to start as soon as possible after the sensor 5 detects the marks. Namely, the writing start position 51 is adjusted so that writing for the first color of the first transfer sheet and the first color of the second transfer sheet starts in synchronism with the sync clock signals having the common count that is counted from the time when the sensor 5 detects the marks. The adjustment is possible only when writing in synchronism with the sync clock signal corresponding to the timing shown with the reference number 78 starts at the timing when a toner image is transferred onto a rear portion between the marks M1 and M2 in the moving direction of the intermediate transfer member 1.

When the number of the transfer sheets is odd, and one transfer sheet is printed during last two rotations of the intermediate transfer member 1, it is not necessary to adjust the writing start position 51 for the last transfer sheet. On the other hand, writing may be delayed. If a moving speed of the intermediate transfer member 1 changes, deviation may occur in foremost edges of transferred images. To avoid the deviation, writing for the first color of a last transfer sheet starts in synchronism with the sync clock signal output immediately after the mark is detected. Timing to start writing may be calculated based on the length of the transfer sheet, a space between the transfer sheets, and the moving speed of the intermediate transfer member 1. Therefore, it is possible to set timing to start writing by arranging the discriminator 66 and the calculator 67.

In another example, start of writing for the first color of the (k*n+1)th transfer sheet during the (2*n+1)th rotation of the intermediate transfer member 1 is controlled with a count L1 obtained by counting with the counter 65 the sync clock signals of the image writer 16a output immediately after the sensor 5 detects a mark before writing starts. Start of writing for the first color of the (k*n+p)th transfer sheet during the (2*n+1)th rotation of the intermediate transfer member 1 is controlled with a count L2 obtained by counting with the counter 65 the sync clock signals of the image writer 16a output immediately after the sensor 5 detects a mark before writing starts. Writing starts at timing when the counts L1 and L2 are equal. Similarly, writing for the third color of the (k*n+1)th transfer sheet and the third color of the (k*n+p)th transfer sheet during the (2*n+2)th rotation of the intermediate transfer member 1 starts at timing when the counts L1 and L2 are equal.

As described above, when two transfer sheets are placed per one perimeter of the intermediate transfer member 1 in the image forming apparatus 100 including the two image stations 31 and 32, writing for the first color of an odd number transfer sheet and the first color of an even number transfer sheet starts at timing when a value of a count of the sync clock signals output from the time when the sensor 5 detects a mark immediately before writing starts until the time when writing starts relatively decreases as much as possible. Thus, even if a moving speed of the intermediate transfer member 1 changes, it is possible to decrease deviation in foremost edges of transferred images in the second color. Similar effects may be obtained for the third and fourth colors.

In another example, when one transfer sheet is printed during the last two rotations of the intermediate transfer member 1, writing for the first color of the (k*n+1)th transfer sheet starts in synchronism with the sync clock signal of the image writer 16a output immediately after the sensor 5 detects a mark during the (2*n+1)th rotation of the intermediate transfer member 1. Writing for the third color of the (k*n+1)th transfer sheet starts in synchronism with the sync clock signal of the image writer 16a output immediately after the sensor 5 detects the mark during the (2*n+2)th rotation of the intermediate transfer member 1.

As described above, when two transfer sheets are placed per one perimeter of the intermediate transfer member 1 in the image forming apparatus 100 including the two image stations 31 and 32, writing starts in synchronism with the sync clock signal of the image writer 16a output immediately after the sensor 5 detects a mark when one transfer sheet is printed during the last two rotations of the intermediate transfer member 1. Thus, even if a moving speed of the intermediate transfer member 1 changes, it is possible to decrease deviation in foremost edges of transferred images in the second color.

In another example, the discriminator 66 discriminates the length of the transfer sheet in the sheet conveyance direction. The calculator 67 calculates the writing start position 51 based on a moving speed of the intermediate transfer member 1, the length of the transfer sheet in the sheet conveyance direction measured by the discriminator 66, and a space between the transfer sheets preset based on the length of the transfer sheet in the sheet conveyance direction. The sensor 5 detects foremost and tail edges of the transfer sheet passing under the sensor 5.

In the present example, the calculator 67 calculates a count of the sync clock signals output immediately after the sensor 5 detects a mark before writing starts.

As described above, the calculator 67 causes the writing start position 51 to be adjusted based on the length of the transfer sheet and the number of prints. Thus, it is possible to decrease deviation in foremost edges of transferred images.

Another embodiment of the present invention is explained below with reference to FIGS. 6 and 7. The structure of the image forming apparatus 100 and the image forming processes according to the preceding embodiment are applied to the present embodiment.

Figure 6:
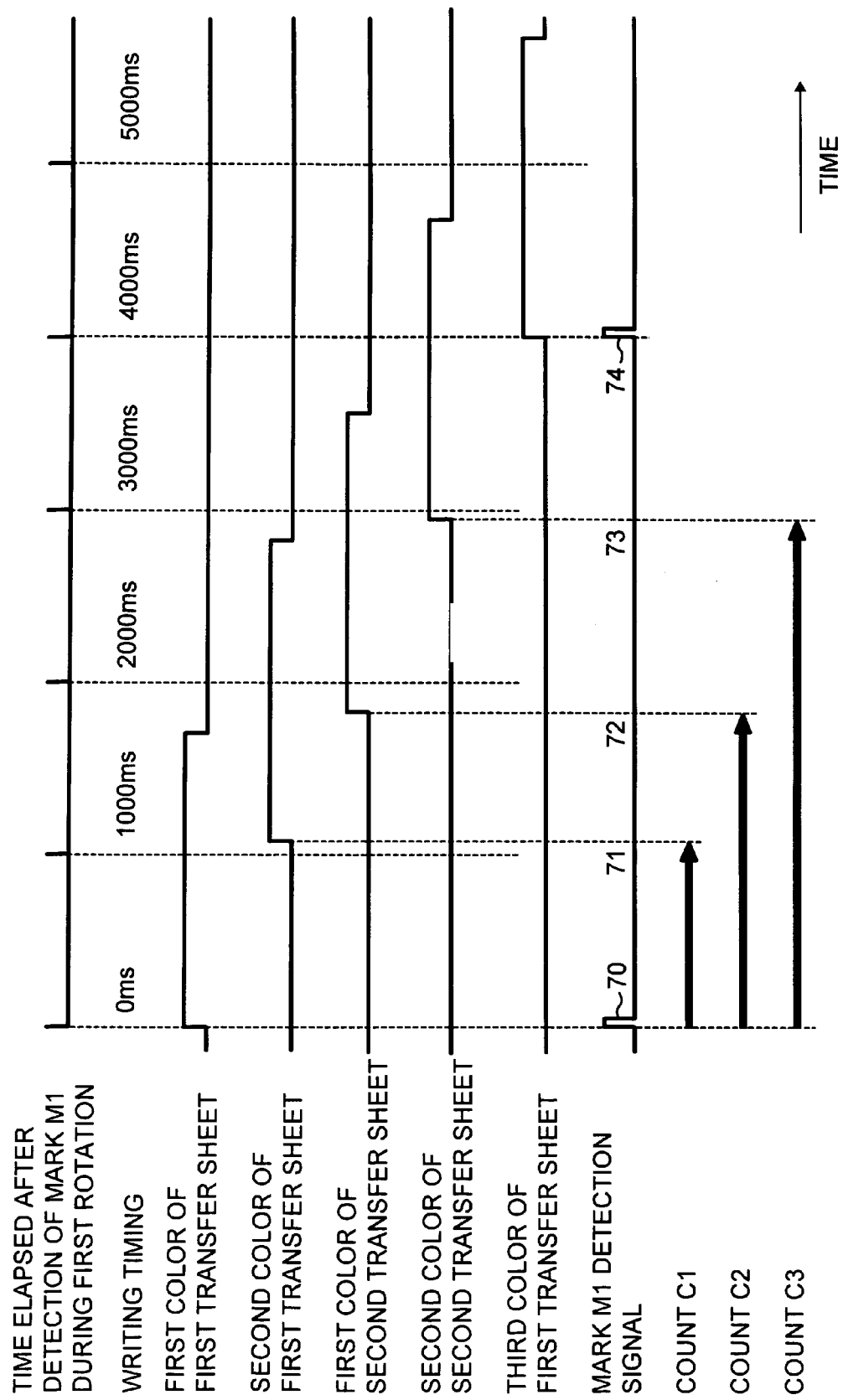
FIG. 6 is a timing chart illustrating timings for another image writing operation performed by the image forming apparatus of FIG. 1.

Each of a time period between the timings shown with the reference numbers 70 and 72 in FIG. 6 and a time period between the timings shown with the reference numbers 75 and 78 in FIG. 7 is equivalent to a time period required for the intermediate transfer member 1 to move the distance equal to the length of the transfer sheet plus a space between the transfer sheets in the sheet conveyance direction.

If the plurality of marks evenly spaced on the intermediate transfer member 1, that is, the marks M1 and M2, are arranged in a manner that a time period required for the intermediate transfer member 1 to move a distance obtained by multiplying a space between the marks M1 and M2 by "f" (i.e., a positive integer) matches with any one of the time period between the timings shown with the reference numbers 70 and 72 in FIG. 6 and the time period between the timings shown with the reference numbers 75 and 78 in FIG. 7, writing for the first color may start in synchronism with the sync clock signal output immediately after the sensor 5 detects a mark. Writing for the third color starts by using the common mark which is detected again after one rotation of the intermediate transfer member 1. Thus, even if a moving speed of the intermediate transfer member 1 changes, the writing start positions 51 for the first and third colors match with each other.

In another example, a time difference T1 indicates a time difference between the timing to start writing for the first color of the (k*n+1)th transfer sheet and the timing to start writing for the first color of the (k*n+p)th transfer sheet during the (2*n+1)th rotation of the intermediate transfer member 1. A time period T2 indicates a time period required for the intermediate transfer member 1 to move a distance between adjacent marks on the intermediate transfer member 1. A relationship between the time difference Ti and the time period T2 is shown by an equation T1=S*T2. "S" is an integer not smaller than one.

As described above, when two transfer sheets are placed per one perimeter of the intermediate transfer member 1 in the image forming apparatus 100 including the two image stations 31 and 32, the marks are spaced on the intermediate transfer member 1 based on the length of the transfer sheet in a manner that a distance equal to the length of the transfer sheet plus a space between the transfer sheets in the sheet conveyance direction is provided between the adjacent two marks. Thus, it is possible to decrease deviation in foremost edges of images transferred onto the even number transfer sheet.

Another embodiment of the present invention is explained below with reference to FIG. 6. The structure of the image forming apparatus 100 and the image forming processes according to the preceding embodiment are applied to the present embodiment.

According to the preceding embodiments, writing starts in synchronism with the sync clock signal output immediately after the sensor 5 detects a mark. According to the present embodiment, a first reference count B is provided to delay the timing to start writing by a number of counts indicated by the first reference count B, and similarly to delay the timing to stop writing by the number of counts indicated by the first reference count B. Thus, a position on the intermediate transfer member 1 onto which a toner image is transferred can be arbitrarily changed.

The adjuster 68 changes the first reference count B. The storage 69 stores the first reference count B. The adjuster 68 and the storage 69 are provided to control and change the preset first reference count B based on environmental and usage conditions such as the number of prints, a print rate, a time period of usage, an environmental temperature change, etc.

For monochrome printing, toner images are not superimposed. Thus, it is not necessary to control adjustment of the writing start position 51 for each color. Moreover, it is not necessary to switch between the development rollers 11a and 12a and between the development rollers 11b and 12b. For monochrome printing, writing for the first transfer sheet starts at the timing shown with the reference number 70. Writing for the second transfer sheet starts at the timing shown with the reference number 72.

In another example, writing starts in synchronism with the sync clock signal delayed by the number of counts indicated by the first reference count B from the sync clock signal output immediately after the sensor 5 detects a mark. Writing stops in synchronism with the sync clock signal delayed by the number of counts indicated by the first reference count B. Thus, a position on the intermediate transfer member 1 onto which a toner image is transferred can be arbitrarily changed to prevent degradation of the intermediate transfer member 1.

In another example, the adjuster 68 and the storage 69 change the first reference count B based on an environmental temperature, the number of prints, and a time period of usage. Thus, a position on the intermediate transfer member 1 onto which a toner image is transferred can be changed based on the usage condition to prevent degradation of the intermediate transfer member 1.

In another example, writing starts when a predetermined time period elapses after the sensor 5 detects a mark to print a monochrome image.

For monochrome printing, it is not necessary to control adjustment of the writing start position 51 for each color. Moreover, it is not necessary to switch between the development rollers 11a and 12a and between the development rollers 11b and 12b. Thus, control using a different sequence may increase a printing speed.

Another embodiment of the present invention is explained below with reference to FIG. 10.

Figure 10:
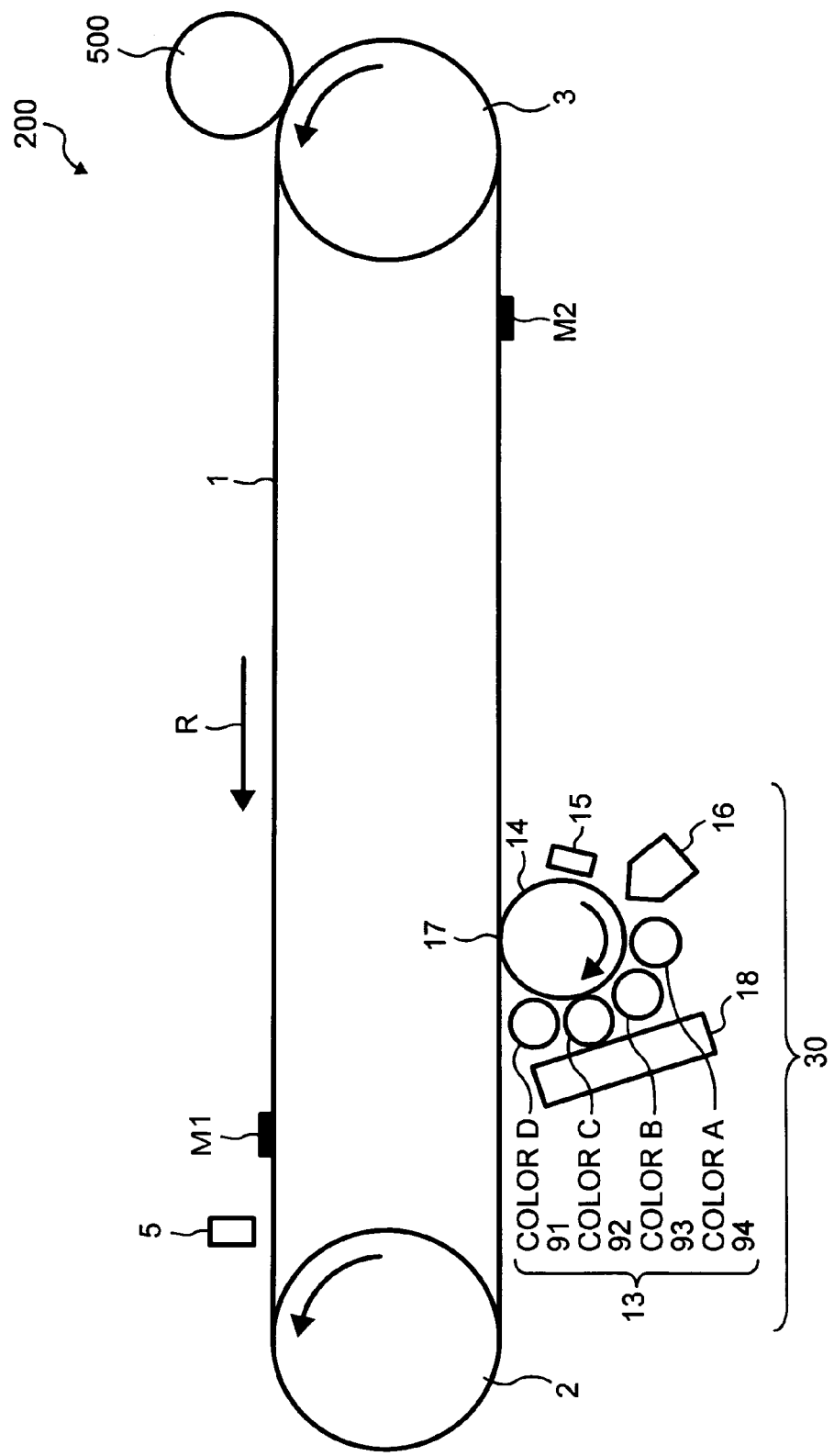
FIG. 10 is an illustration illustrating an image forming apparatus according to another exemplary embodiment of the present invention.

As illustrated in FIG. 10, an image forming apparatus 200 includes one image station 30. The image station 30 replaces the image stations 31 and 32. A photoconductive drum 14 replaces the photoconductive drums 14a and 14b. A charger 15 replaces the chargers 15a and 15b. An image writer 16 replaces the image writers 16a and 16b. A development unit 13 replaces the development units 13a and 13b. A switcher 18 replaces the switchers 18a and 18b. A transfer position 17 replaces the transfer positions 17a and 17b.

The development unit 13 includes development rollers 91, 92, 93, and 94.

The development roller 94 visualizes an electrostatic latent image with toner to form a toner image in the color A. The development roller 93 visualizes an electrostatic latent image with toner to form a toner image in the color B. The development roller 92 visualizes an electrostatic latent image with toner to form a toner image in the color C. The development roller 91 visualizes an electrostatic latent image with toner to form a toner image in the color D. The switcher 18 selectively drives one of the development rollers 91, 92, 93, and 94.

Any one of the toner images in the colors A, B, C, and D is transferred and superimposed onto the intermediate transfer member 1 while the intermediate transfer member 1 rotates for one cycle. When the intermediate transfer member 1 rotates for four cycles, the toner images in the colors A, B, C, and D are transferred and superimposed onto the intermediate transfer member 1 to form a full-color toner image.

FIG. 10 illustrates only two marks, that is, the marks M1 and M2. However, a plurality of marks (not shown) can be evenly spaced between the marks M1 and M2 as illustrated in FIG. 9.

The present embodiment uses the intermediate transfer member 1 on one perimeter of which up to two A4-size transfer sheets can be placed in line.

As illustrated in FIG. 11, after the sensor 5 detects the mark M1, the image writer 16 starts writing for the first color of the first transfer sheet at the timing shown with the reference number 75 in synchronism with the sync clock signal of the image writer 16 output immediately after the sensor 5 detects the mark M1.

The timing shown with the reference number 77 after the count C7 elapses is referred to as the timing when the sensor 5 detects the mark M2 immediately before the timing shown with the reference number 78. The timing shown with the reference number 78 is equivalent to a time period required for the intermediate transfer member 1 to move the distance equal to the length of the transfer sheet plus a space between the transfer sheets in the sheet conveyance direction, that is, the rotating direction R, after the sensor 5 detects the mark M1.

The image writer 16 starts writing for the first color of the second transfer sheet at the timing shown with the reference number 78 after the count C5 elapses. The count C5 is equivalent to a time period from the timing shown with the reference number 77 until the timing shown with the reference number 78.

After the sensor 5 detects the mark M1 which has rotated for one cycle of the intermediate transfer member 1 at the timing shown with a reference number 80, the image writer 16 starts writing for the second color of the first transfer sheet, and subsequently for the second color of the second transfer sheet as described above. After the sensor 5 detects the mark M1 which has rotated for another one cycle of the intermediate transfer member 1, the image writer 16 starts writing for the third color of the first transfer sheet, and subsequently for the third color of the second transfer sheet as described above. After the sensor 5 detects the mark M1 which has rotated for yet another one cycle of the intermediate transfer member 1, the image writer 16 starts writing for the fourth color of the first transfer sheet, and subsequently for the fourth color of the second transfer sheet as described above.

According to the present embodiment, writing for the second, third, and fourth colors of the second transfer sheet respectively starts by using the common mark M2 which has rotated for one, two, and three cycles of the intermediate transfer member 1 after being -used in writing for the first color of the second transfer sheet. Thus, it is possible to improve accuracy in correcting image deviation as is in writing for the first transfer sheet.

The present invention has been described above with reference to specific embodiments. Note that the present invention is not limited to the details of the embodiments described above, but various modifications and improvements are possible without departing from the spirit and scope of the invention.

The invention claimed is:

1. An image forming apparatus which generates a sync clock signal and produces a color image by forming and superimposing first, second, third, and fourth elementary color toner images of a color image sequentially in this order in synchronism with the sync clock signal, the apparatus comprising:

a first image forming mechanism configured to selectively form the first and third elementary color toner images of the color image;

a second image forming mechanism configured to selectively form the second and fourth elementary color toner images of the color image;

an intermediate transfer member including a reference marking and configured to perform two rotations per one cycle of producing a color image of the first, second, third, and fourth elementary color toner images sequentially superimposed;

a mark detection mechanism configured to detect the reference marking on the intermediate transfer member;

a measuring mechanism configured to measure a time that elapses after a detection of the reference marking by the mark detection mechanism; and a controller configured to instruct the first and second image forming mechanisms to start sequentially and alternately image writing for the first, second, third, and fourth elementary color toner images of the specific color image based on a value measured by the measuring mechanism, a number of image productions, and a number of rotations of the intermediate transfer member;

wherein the reference marking includes a plurality of reference marks evenly spaced, and wherein a first image forming operation of the first elementary color toner image performed by the first image forming mechanism is started based on a proximate arbitrary reference mark and each one of subsequent image forming operations is started based on another proximate arbitrary reference mark distant from a preceding reference mark by a total length of a transfer sheet in a sheet conveyance direction applied and a spacing between a preceding transfer sheet and a following transfer sheet; and further comprising:

a storage configured to store a first preset reference count, wherein the image writing starts in synchronism with the sync clock signal delayed by a number of counts indicated by the first reference count from the sync clock signal detected immediately after the detection of the reference marking, and the image writing stops in synchronism with the sync clock signal delayed by the number of counts indicated by the first reference count.

2. The image forming apparatus according to claim 1, wherein the first image forming mechanism in a (n+1)th image production is caused to start the image writing for the first elementary color toner image in synchronism with the sync clock signal detected immediately after the detection of the reference marking during a (2*n+1)th rotation of the intermediate transfer member and the image writing for the third elementary color toner image in synchronism with the sync clock signal detected immediately after the detection of the reference marking during a (2*n+2)th rotation of the intermediate transfer member, and wherein the second image forming mechanism in the (n+1)th image production is caused to start the image writing for the second elementary color toner image in synchronism with the sync clock signal detected immediately after a first predetermined elapsed time period measured by the measuring mechanism immediately after the detection of the reference marking during the (2*n+1)th rotation of the intermediate transfer member and the image writing for the fourth elementary color toner image in synchronism with the sync clock signal detected immediately after the first predetermined elapsed time period measured by the measuring mechanism immediately after the detection of the reference marking during the (2*n+2)th rotation of the intermediate transfer member, wherein "*" is a multiplication sign and "n" is a positive integer satisfying n≧0 and n+1=m when "m" is the number of rotations of the intermediate transfer member.

3. The image forming apparatus according to claim 1, wherein the first image forming mechanism in a (k*n+1)th image production is caused to start the image writing for the first elementary color toner image in synchronism with the sync clock signal detected immediately after the detection of the reference marking during a (2*n+1)th rotation of the intermediate transfer member and the image writing for the third elementary color toner image in synchronism with the sync clock signal detected immediately after the detection of the reference marking during a (2*n+2)th rotation of the intermediate transfer member, and the first image forming mechanism in a (k*n+p)th image production is caused to start the image writing for the first elementary color toner image in synchronism with the sync clock signal detected immediately after a first predetermined "p"th elapsed time period measured by the measuring mechanism immediately after the detection of the reference marking during the (2*n+1)th rotation of the intermediate transfer member and the image writing for the third elementary color toner image in synchronism with the sync clock signal detected immediately after the first predetermined "p"th elapsed time period measured by the measuring mechanism immediately after the detection of the reference marking during the (2*n+2)th rotation of the intermediate transfer member, and wherein the second image forming mechanism in the (k*n+1)th image production is caused to start the image writing for the second elementary color toner image in synchronism with the sync clock signal detected immediately after a second predetermined elapsed time period measured by the measuring mechanism immediately after the detection of the reference marking during the (2*n+1)th rotation of the intermediate transfer member and the image writing for the fourth elementary color toner image in synchronism with the sync clock signal detected immediately after the second predetermined elapsed time period measured by the measuring mechanism immediately after the detection of the reference marking during the (2*n+2)th rotation of the intermediate transfer member, and the second image forming mechanism in a (k*n+p)th image production is caused to start the image writing for the second elementary color toner image in synchronism with the sync clock signal detected immediately after a second predetermined "p"th elapsed time period measured by the measuring mechanism immediately after the detection of the reference marking during the (2*n+1)th rotation of the intermediate transfer member and the image writing for the fourth elementary color toner image in synchronism with the sync clock signal detected immediately after the second predetermined "p"th elapsed time period measured by the measuring mechanism immediately after the detection of the reference marking during the (2*n+2)th rotation of the intermediate transfer member, wherein "k" is a positive integer equal to or greater than 2 and indicates a number of image productions executed per two rotations of the intermediate transfer member, "*" is a multiplication sign, "n" is a positive integer satisfying n≧0 and n+1=m when "m" is the number of rotations of the intermediate transfer member, and "p" is a positive integer variant satisfying 2≦p≧k and identifies the number of image productions.

4. The image forming apparatus according to claim 3, wherein the image writing starts after a predetermined elapsed time period after the detection of the reference marking to produce a monochrome image.

5. The image forming apparatus according to claim 1, further comprising:

a signal counting mechanism configured to count a number of the sync clock signals, wherein the first image forming mechanism in a (n+1)th image production is caused to start the image writing for the first elementary color toner image in synchronism with the sync clock signal detected immediately after the detection of the reference marking during a (2*n+1)th rotation of the intermediate transfer member and the image writing for the third elementary color toner image in synchronism with the sync clock signal detected immediately after the detection of the reference marking during a (2*n+2)th rotation of the intermediate transfer member, and wherein the second image forming mechanism in the (n+1)th image production is caused to start the image writing for the second elementary color toner image in synchronism with a third predetermined sync clock signal counted by the signal counting mechanism immediately after the detection of the reference marking during the (2*n+1)th rotation of the intermediate transfer member and the image writing for the fourth elementary color toner image in synchronism with the third predetermined sync clock signal counted by the signal counting mechanism immediately after the detection of the reference marking during the (2*n+2)th rotation of the intermediate transfer member, wherein "*" is a multiplication sign and "n" is a positive integer satisfying n≧0 and n+1=m when "m" is the number of rotations of the intermediate transfer member.

6. The image forming apparatus according to claim 1, further comprising:

a signal counting mechanism configured to count a number of the sync clock signals, wherein the first image forming mechanism in a (k*n+1)th image production is caused to start the image writing for the first elementary color toner image in synchronism with the sync clock signal detected immediately after the detection of the reference marking during a (2*n+1)th rotation of the intermediate transfer member and the image writing for the third elementary color toner image in synchronism with the sync clock signal detected immediately after the detection of the reference marking during a (2*n+2)th rotation of the intermediate transfer member, and the first image forming mechanism in a (k*n+p)th image production is caused to start the image writing for the first elementary color toner image in synchronism with a first "p"th sync clock signal counted by the signal counting mechanism immediately after the detection of the reference marking during the (2*n+1)th rotation of the intermediate transfer member and the image writing for the third elementary color toner image in synchronism with the first "p"th sync clock signal counted by the signal counting mechanism immediately after the detection of the reference marking during the (2*n+2)th rotation of the intermediate transfer member, and wherein the second image forming mechanism in the (k*n+1)th image production is caused to start the image writing for the second elementary color toner image in synchronism with a fourth predetermined sync clock signal counted by the signal counting mechanism immediately after the detection of the reference marking during the (2*n+1)th rotation of the intermediate transfer member and the image writing for the fourth elementary color toner image in synchronism with the fourth predetermined sync clock signal counted by the signal counting mechanism immediately after the detection of the reference marking during the (2*n+2)th rotation of the intermediate transfer member, and the second image forming mechanism in the (k*n+p)th image production is caused to start the image writing for the second elementary color toner image in synchronism with a second "p"th sync clock signal counted by the signal counting mechanism immediately after the detection of the reference marking during the (2*n+1)th rotation of the intermediate transfer member and the image writing for the fourth elementary color toner image in synchronism with the second "p"th sync clock signal counted by the signal counting mechanism immediately after the detection of the reference marking during the (2*n+2)th rotation of the intermediate transfer member, wherein "k" is a positive integer equal to or greater than 2 and indicates a number of image productions executed per two rotations of the intermediate transfer member, "*" is a multiplication sign, "n" is a positive integer satisfying n≧0 and n+1=m when "m" is the number of rotations of the intermediate transfer member, and "p" is a positive integer variant satisfying 2≦p≧k and identifies the number of image productions.

7. The image forming apparatus according to claim 1, further comprising:

a signal counting mechanism configured to count a number of the sync clock signals, wherein the reference marking includes a plurality of reference marks evenly spaced, and wherein the controller previously stores a reference number of the sync clock signals measured between two arbitrary reference marks of the plurality of reference marks, the signal counting mechanism counts an actual number of the sync clock signals generated between the two arbitrary reference marks when the image writing is performed, and the controller performs a comparison of the actual number of sync clock signals with the reference number of the sync clock signals and adjusts the timings of the image writing by the first and second image forming mechanisms based on a result of the comparison.

8. The image forming apparatus according to claim 1, further comprising:

a signal counting mechanism configured to count a number of the sync clock signals, wherein the first image forming mechanism in a (k*n+1)th image production is caused to start the image writing for the first elementary color toner image in synchronism with the sync clock signal detected immediately after a predetermined elapsed count measured by the signal counting mechanism after the detection of the proximate arbitrary reference mark during a (2*n+1)th rotation of the intermediate transfer member and the first image forming mechanism in a (k*n+p)th image production is caused to start the image writing for the first elementary color toner image in synchronism with the sync clock signal detected immediately after the predetermined elapsed count measured by the signal counting mechanism after the detection of the another proximate arbitrary reference mark during the (2*n+1)th rotation of the intermediate transfer member, and wherein the first image forming mechanism in the (k*n+1)th image production is caused to start the image writing for the third elementary color toner image in synchronism with the sync clock signal detected immediately after the predetermined elapsed count measured by the signal counting mechanism after the detection of the proximate arbitrary reference mark during a (2*n+2)th rotation of the intermediate transfer member and the first image forming mechanism in the (k*n+p)th image production is caused to start the image writing for the third elementary color toner image in synchronism with the sync clock signal detected immediately after the predetermined elapsed count measured by the signal counting mechanism after the detection of the another proximate arbitrary reference mark during the (2*n+2)th rotation of the intermediate transfer member, wherein "k" is a positive integer satisfying $1 \leq k \leq p$ and indicates a number of image productions executed per two rotations of the intermediate transfer member, "*" is a multiplication sign, "n" is a positive integer satisfying $n \geq 0$ and n+1=m when "m" is the number of rotations of the intermediate transfer member, and "p" is a positive integer variant satisfying $2 \leq p \geq k$ and identifies the number of image productions.

9. The image forming apparatus according to claim 8, wherein, when one transfer sheet is printed during a last two rotations of the intermediate transfer member, the first image forming mechanism in the (k*n+1)th image production is caused to start the image writing for the first elementary color toner image in synchronism with the sync clock signal detected immediately after the detection of the proximate arbitrary reference mark during the (2*n+1)th rotation of the intermediate transfer member and the image writing for the third elementary color toner image in synchronism with the sync clock signal detected immediately after the detection of the proximate arbitrary reference mark during the (2*n+2)th rotation of the intermediate transfer member.

10. The image forming apparatus according to claim 1, further comprising:
a discriminator configured to discriminate length of the transfer sheet in the sheet conveyance direction; and
a calculator configured to calculate a position to start the image writing based on a moving speed of the intermediate transfer member, the length of the transfer sheet in the sheet conveyance direction discriminated by the discriminator, and a spacing between the transfer sheets preset based on the length of the transfer sheet in the sheet conveyance direction, and to count the sync clock signals detected immediately after the mark detection mechanism detects each proximate arbitrary reference mark before the image writing starts.

11. The image forming apparatus according to claim 1, wherein a time difference between timings at which the first image forming mechanism is caused to start the image writing for the first elementary color toner image in a preceding image production and in a following image production during a (2*n+1)th rotation of the intermediate transfer member, and a time period required for the intermediate transfer member to move a distance between adjacent reference marks satisfies an equation T1=S*T2, wherein T1 is the time difference and T2 is the time period, "k" is a positive integer satisfying $1 \leq k \leq p$ and indicates a number of image productions executed per two rotations of the intermediate transfer member, "*" is a multiplication sign, "n" is a positive integer variable equal to or greater than 0, "p" is a positive integer variant satisfying $2 \leq p \geq k$ and identifies the number of image productions, and "S" is an integer equal to or greater than 1.

12. The image forming apparatus according to claim 1, further comprising:
an adjuster configured to change the first reference count based on at least one of an environmental temperature, a number of prints, and a time period of usage.

13. An image forming apparatus which generates a sync clock signal and produces a color image by forming and superimposing first, second, third, and fourth elementary color toner images of a color image sequentially in this order in synchronism with the sync clock signal, the apparatus comprising:
first image forming means for selectively forming the first and third elementary color toner images of the color image;
second image forming means for selectively forming the second and fourth elementary color toner images of the color image;
intermediate transfer means including a reference marking and for performing two rotations per one cycle of producing a color image of the first, second, third, and fourth elementary color toner images sequentially superimposed;
mark detection means for detecting the reference marking on the intermediate transfer means;
measuring means for measuring a time that elapses after a detection of the reference marking by the mark detection means; and
controlling means for instructing the first and second image forming means to start sequentially and alternately image writing for the first, second, third, and fourth elementary color toner images of the specific color image based on a value measured by the measuring means, a number of image productions, and a number of rotations of the intermediate transfer means;
wherein the reference marking includes a plurality of reference marks evenly spaced, and
wherein a first image forming operation of the first elementary color toner image performed by the first image forming means is started based on a proximate arbitrary reference mark and each one of subsequent image forming operations is started based on another proximate arbitrary reference mark distant from a preceding reference mark by a total length of a transfer sheet in a sheet conveyance direction applied and a spacing between a preceding transfer sheet and a following transfer sheet; and further comprising:
storing means for storing a first preset reference count,
wherein the image writing starts in synchronism with the sync clock signal delayed by a number of counts indicated by the first reference count from the sync clock signal detected immediately after the detection of the reference marking, and the image writing stops in synchronism with the sync clock signal delayed by the number of counts indicated by the first reference count.

14. The image forming apparatus according to claim 13, further comprising:
signal counting means for counting a number of the sync clock signals,
wherein the first image forming means in a (n+1)th image production is caused to start the image writing for the first elementary color toner image in synchronism with the sync clock signal detected immediately after the detection of the reference marking during a (2*n+1)th rotation of the intermediate transfer means and the image writing for the third elementary color toner image in synchronism with the sync clock signal detected immediately after the detection of the reference marking during a (2*n+2)th rotation of the intermediate transfer means, and
wherein the second image forming means in the (n+1)th image production is caused to start the image writing for the second elementary color toner image in synchronism with a third predetermined sync clock signal counted by the signal counting means immediately after the detection of the reference marking during the (2*n+1)th rotation of the intermediate transfer means and the image writing for the fourth elementary color toner image in synchronism with the third predetermined sync clock signal counted by the signal counting means immediately after the detection of the reference marking during the (2*n+2)th rotation of the intermediate transfer means,
wherein "*" is a multiplication sign and "n" is a positive integer satisfying n≧0 and n+1=m when "m" is the number of rotations of the intermediate transfer means.

15. The image forming apparatus according to claim 13, further comprising:
signal counting means for counting a number of the sync clock signals,
wherein the first image forming means in a (k*n+1)th image production is caused to start the image writing for the first elementary color toner image in synchronism with the sync clock signal detected immediately after the detection of the reference marking during a (2*n+1)th rotation of the intermediate transfer means and the image writing for the third elementary color toner image in synchronism with the sync clock signal detected immediately after the detection of the reference marking during a (2*n+2)th rotation of the intermediate transfer means, and the first image forming means in a (k*n+p)th image production is caused to start the image writing for the first elementary color toner image in synchronism with a first "p"th sync clock signal counted by the signal counting means immediately after the detection of the reference marking during the (2*n+1)th rotation of the intermediate transfer means and the image writing for the third elementary color toner image in synchronism with the first "p"th sync clock signal counted by the signal counting means immediately after the detection of the reference marking during the (2*n+2)th rotation of the intermediate transfer means, and
wherein the second image forming means in the (k*n+1)th image production is caused to start the image writing for the second elementary color toner image in synchronism with a fourth predetermined sync clock signal counted by the signal counting means immediately after the detection of the reference marking during the (2*n+1)th rotation of the intermediate transfer means and the image writing for the fourth elementary color toner image in synchronism with the fourth predetermined sync clock signal counted by the signal counting means immediately after the detection of the reference marking during the (2*n+2)th rotation of the intermediate transfer means, and the second image forming means in the (k*n+p)th image production is caused to start the image writing for the second elementary color toner image in synchronism with a second "p"th sync clock signal counted by the signal counting means immediately after the detection of the reference marking during the (2*n+1)th rotation of the intermediate transfer means and the image writing for the fourth elementary color toner image in synchronism with the second "p"th sync clock signal counted by the signal counting means immediately after the detection of the reference marking during the (2*n+2)th rotation of the intermediate transfer means,
wherein "k" is a positive integer equal to or greater than 2 and indicates a number of image productions executed per two rotations of the intermediate transfer means, "*" is a multiplication sign, "n" is a positive integer satisfying n≧0 and n+1=m when "m" is the number of rotations of the intermediate transfer means, and "p" is a positive integer variant satisfying 2≦p≧k and identifies the number of image productions.

16. The image forming apparatus according to claim 13, further comprising:
signal counting means for counting a number of the sync clock signals,
wherein the reference marking includes a plurality of reference marks evenly spaced, and
wherein the controlling means previously stores a reference number of the sync clock signals measured between two arbitrary reference marks of the plurality of reference marks, the signal counting means counts an actual number of the sync clock signals generated between the two arbitrary reference marks when the image writing is performed, and the controlling means performs a comparison of the actual number of sync clock signals with the reference number of the sync clock signals and adjusts the timings of the image writing by the first and second image forming means based on a result of the comparison.

17. The image forming apparatus according to claim 13, further comprising:
signal counting means for counting a number of the sync clock signals,
wherein the first image forming means in a (k*n+1)th image production is caused to start the image writing for the first elementary color toner image in synchronism with the sync clock signal detected immediately after a predetermined elapsed count measured by the signal counting means after the detection of the proximate arbitrary reference mark during a (2*n+1)th rotation of the intermediate transfer means and the first image forming means in a (k*n+p)th image production is caused to start the image writing for the first elementary color toner image in synchronism with the sync clock signal detected immediately after the predetermined elapsed count measured by the signal counting means after the detection of the another proximate arbitrary reference mark during the (2*n+1)th rotation of the intermediate transfer means, and
wherein the first image forming means in the (k*n+1)th image production is caused to start the image writing for the third elementary color toner image in synchronism with the sync clock signal detected immediately after the predetermined elapsed count measured by the signal counting means after the detection of the proximate arbitrary reference mark during a (2*n+2)th rotation of the intermediate transfer means and the first image forming means in the (k*n+p)th image production is caused to start the image writing for the third elementary color toner image in synchronism with the sync clock signal detected immediately after the predetermined elapsed count measured by the signal counting means after the detection of the another proximate arbitrary reference mark during the (2*n+2)th rotation of the intermediate transfer means, wherein "k" is a positive integer satisfying $1 \leq k \leq p$ and indicates a number of image productions executed per two rotations of the intermediate transfer means, "*" is a multiplication sign, "n" is a positive integer satisfying $n \geq 0$ and n+1=m when "m" is the number of rotations of the intermediate transfer means, and "p" is a positive integer variant satisfying $2 \leq p \leq k$ and identifies the number of image productions.

18. The image forming apparatus according to claim 13, further comprising:

discriminating means for discriminating length of the transfer sheet in the sheet conveyance direction; and calculating means for calculating a position to start the image writing based on a moving speed of the intermediate transfer means, the length of the transfer sheet in the sheet conveyance direction discriminated by the discriminating means, and a spacing between the transfer sheets preset based on the length of the transfer sheet in the sheet conveyance direction, and for counting the sync clock signals detected immediately after the mark detection means detects each proximate arbitral reference mark before the image writing starts.

19. The image forming apparatus according to claim 13, further comprising:

adjusting means for changing the first reference count based on at least one of an environmental temperature, a number of prints, and a time period of usage.

20. An image forming method which generates a sync clock signal and produces a color image by forming and superimposing first, second, third, and fourth elementary color toner images of a color image sequentially in this order in synchronism with the sync clock signal, the method comprising:

rotating an intermediate transfer member which is provided with a reference marking and which performs two rotations per one cycle of producing a color image of the first, second, third, and fourth elementary color toner images to be sequentially superimposed;

selectively forming the first and third elementary color toner images of the color image by using a first image forming mechanism;

selectively forming the second and fourth elementary color toner images of the color image by using a second image forming mechanism;

detecting the reference marking on the intermediate transfer member by using a mark detection mechanism;

measuring, by using a measuring mechanism, a time that elapses after a detection of the reference marking by the mark detection mechanism; and instructing, by using a controller, the first and second image forming mechanisms to start sequentially and alternately image writing for the first, second, third, and fourth elementary color toner images of the specific color image based on a value measured by the measuring mechanism, a number of image productions, and a number of rotations of the intermediate transfer member;

arranging a plurality of reference marks evenly spaced on the intermediate transfer member;

starting a first image forming operation of the first elementary color toner image performed by the first image forming mechanism based on a proximate arbitrary reference mark; and starting each one of subsequent image forming operations based on another proximate arbitrary reference mark distant from a preceding reference mark by a total length of a transfer sheet in a sheet conveyance direction applied and a spacing between a preceding transfer sheet and a following transfer sheet;

storing a first preset reference count into a storage;

starting the image writing in synchronism with the sync clock signal delayed by a number of counts indicated by the first reference count from the sync clock signal detected immediately after the detection of the reference marking; and stopping the image writing in synchronism with the sync clock signal delayed by the number of counts indicated by the first reference count.

21. The method according to claim 20, further comprising:

starting, by using the first image forming mechanism in a (n+1)th image production, the image writing for the first elementary color toner image in synchronism with the sync clock signal detected immediately after the detection of the reference marking during a (2*n+1)th rotation of the intermediate transfer member;

starting, by using the first image forming mechanism in the (n+1)th image production, the image writing for the third elementary color toner image in synchronism with the sync clock signal detected immediately after the detection of the reference marking during a (2*n+2)th rotation of the intermediate transfer member;

starting, by using the second image forming mechanism in the (n+1)th image production, the image writing for the second elementary color toner image in synchronism with the sync clock signal detected immediately after a first predetermined elapsed time period measured by the measuring mechanism immediately after the detection of the reference marking during the (2*n+1)th rotation of the intermediate transfer member; and starting, by using the second image forming mechanism in the (n+1)th image production, the image writing for the fourth elementary color toner image in synchronism with the sync clock signal detected immediately after the first predetermined elapsed time period measured by the measuring mechanism immediately after the detection of the reference marking during the (2*n+2)th rotation of the intermediate transfer member, wherein "*" is a multiplication sign and "n" is a positive integer satisfying $n \geq 0$ and n+1=m when "m" is the number of rotations of the intermediate transfer member.

22. The method according to claim 20, further comprising:

starting, by using the first image forming mechanism in a (k*n+1)th image production, the image writing for the first elementary color toner image in synchronism with the sync clock signal detected immediately after the detection of the reference marking during a (2*n+1)th rotation of the intermediate transfer member;

starting, by using the first image forming mechanism in the (k*n+1)th image production, the image writing for the third elementary color toner image in synchronism with the sync clock signal detected immediately after the detection of the reference marking during a (2*n+2)th rotation of the intermediate transfer member;

starting, by using the first image forming mechanism in a (k*n+p)th image production, the image writing for the first elementary color toner image in synchronism with the sync clock signal detected immediately after a first predetermined "p"th elapsed time period measured by the measuring mechanism immediately after the detection of the reference marking during the (2*n+1)th rotation of the intermediate transfer member;

starting, by using the first image forming mechanism in the (k*n+p)th image production, the image writing for the third elementary color toner image in synchronism with the sync clock signal detected immediately after the first predetermined "p"th elapsed time period measured by the measuring mechanism immediately after the detection of the reference marking during the (2*n+2)th rotation of the intermediate transfer member;

starting, by using the second image forming mechanism in the (k*n+1)th image production, the image writing for the second elementary color toner image in synchronism with the sync clock signal detected immediately after a second predetermined elapsed time period measured by the measuring mechanism immediately after the detection of the reference marking during the (2*n+1)th rotation of the intermediate transfer member;

starting, by using the second image forming mechanism in the (k*n+1)th image production, the image writing for the fourth elementary color toner image in synchronism with the sync clock signal detected immediately after the second predetermined elapsed time period measured by the measuring mechanism immediately after the detection of the reference marking during the (2*n+2)th rotation of the intermediate transfer member;

starting, by using the second image forming mechanism in a (k*n+p)th image production, the image writing for the second elementary color toner image in synchronism with the sync clock signal detected immediately after a second predetermined "p"th elapsed time period measured by the measuring mechanism immediately after the detection of the reference marking during the (2*n+1)th rotation of the intermediate transfer member; and starting, by using the second image forming mechanism in the (k*n+p)th image production, the image writing for the fourth elementary color toner image in synchronism with the sync clock signal detected immediately after the second predetermined "p"th elapsed time period measured by the measuring mechanism immediately after the detection of the reference marking during the (2*n+2)th rotation of the intermediate transfer member; and starting, by using the second image forming mechanism in the (k*n+p)th image production, the image writing for the fourth elementary color toner image in synchronism with the sync clock signal detected immediately after the second predetermined "p"th elapsed time period measured by the measuring mechanism immediately after the detection of the reference marking during the (2*n+2)th rotation of the intermediate transfer member, wherein "k" is a positive integer equal to or greater than 2 and indicates a number of image productions executed per two rotations of the intermediate transfer member, "*" is a multiplication sign, "n" is a positive integer satisfying n≧0 and n+1=m when "m" is the number of rotations of the intermediate transfer member, and "p" is a positive integer variant satisfying 2≦p≧k and identifies the number of image productions.

23. The method according to claim 22, further comprising:
starting the image writing after a predetermined elapsed time period after the detection of the reference marking to produce a monochrome image.

24. The method according to claim 20, further comprising:
counting a number of the sync clock signals by using a signal counting mechanism;

starting, by using the first image forming mechanism in a (n+1)th image production, the image writing for the first elementary color toner image in synchronism with the sync clock signal detected immediately after the detection of the reference marking during a (2*n+1)th rotation of the intermediate transfer member;

starting, by using the first image forming mechanism in the (n+1)th image production, the image writing for the third elementary color toner image in synchronism with the sync clock signal detected immediately after the detection of the reference marking during a (2*n+2)th rotation of the intermediate transfer member;

starting, by using the second image forming mechanism in the (n+1)th image production, the image writing for the second elementary color toner image in synchronism with a third predetermined sync clock signal counted by the signal counting mechanism immediately after the detection of the reference marking during the (2*n+1)th rotation of the intermediate transfer member; and starting, by using the second image forming mechanism in the (n+1)th image production, the image writing for the fourth elementary color toner image in synchronism with the third predetermined sync clock signal counted by the signal counting mechanism immediately after the detection of the reference marking during the (2*n+2)th rotation of the intermediate transfer member, wherein "k" is a multiplication sign and "n" is a positive integer satisfying n≧0 and n+1=m when "m" is the number of rotations of the intermediate transfer member.

25. The method according to claim 20, further comprising:
counting a number of the sync clock signals by using a signal counting mechanism;

starting, by using the first image forming mechanism in a (k*n+1)th image production, the image writing for the first elementary color toner image in synchronism with the sync clock signal detected immediately after the detection of the reference marking during a (2*n+1)th rotation of the intermediate transfer member;

starting, by using the first image forming mechanism in the (k*n+1)th image production, the image writing for the third elementary color toner image in synchronism with the sync clock signal detected immediately after the detection of the reference marking during a (2*n+2)th rotation of the intermediate transfer member;

starting, by using the first image forming mechanism in a (k*n+p)th image production, the image writing for the first elementary color toner image in synchronism with a first "p"th sync clock signal counted by the signal counting mechanism immediately after the detection of the reference marking during the (2*n+1)th rotation of the intermediate transfer member;

starting, by using the first image forming mechanism in the (k*n+p)th image production, the image writing for the third elementary color toner image in synchronism with the first "p"th sync clock signal counted by the signal counting mechanism immediately after the detection of the reference marking during the (2*n+2)th rotation of the intermediate transfer member;

starting, by using the second image forming mechanism in the (k*n+1)th image production, the image writing for the second elementary color toner image in synchronism with a fourth predetermined sync clock signal counted by the signal counting mechanism immediately after the detection of the reference marking during the (2*n+1)th rotation of the intermediate transfer member;

starting, by using the second image forming mechanism in the (k*n+1)th image production, the image writing for the fourth elementary color toner image in synchronism with the fourth predetermined sync clock signal counted by the signal counting mechanism immediately after the detection of the reference marking during the (2*n+2)th rotation of the intermediate transfer member;

starting, by using the second image forming mechanism in the (k*n+p)th image production, the image writing for the second elementary color toner image in synchronism with a second "p"th sync clock signal counted by the signal counting mechanism immediately after the detection of the reference marking during the (2*n+1)th rotation of the intermediate transfer member; and starting, by using the second image forming mechanism in the (k*n+p)th image production, the image writing for the fourth elementary color toner image in synchronism with the second "p"th sync clock signal counted by the signal counting mechanism immediately after the detection of the reference marking during the (2*n+2)th rotation of the intermediate transfer member, wherein "k" is a positive integer equal to or greater than 2 and indicates a number of image productions executed per two rotations of the intermediate transfer member, "*" is a multiplication sign, "n" is a positive integer satisfying $n \geq 0$ and n+1=m when "m" is the number of rotations of the intermediate transfer member, and "p" is a positive integer variant satisfying $2 \leq p \geq k$ and identifies the number of image productions.

26. The method according to claim 20, further comprising:
counting a number of the sync clock signals by using a signal counting mechanism;
arranging a plurality of reference marks evenly spaced on the intermediate transfer member;
previously storing, by using the controller, a reference number of the sync clock signals measured between two arbitrary reference marks of the plurality of reference marks;
counting, by using the signal counting mechanism, an actual number of the sync clock signals generated between the two arbitrary reference marks when the image writing is performed;
comparing, by using the controller, the actual number of sync clock signals with the reference number of the sync clock signals; and
adjusting the timings of the image writing by the first and second image forming mechanisms based on a result of the comparison.

27. The method according to claim 20, further comprising:
counting a number of the sync clock signals by using a signal counting mechanism;
starting, by using the first image forming mechanism in a (k*n+1)th image production, the image writing for the first elementary color toner image in synchronism with the sync clock signal detected immediately after a predetermined elapsed count measured by the signal counting mechanism after the detection of the proximate arbitrary reference mark during a (2*n+1)th rotation of the intermediate transfer member;

starting, by using the first image forming mechanism in a (k*n+p)th image production, the image writing for the first elementary color toner image in synchronism with the sync clock signal detected immediately after the predetermined elapsed count measured by the signal counting mechanism after the detection of the another proximate arbitrary reference mark during the (2*n+1)th rotation of the intermediate transfer member;

starting, by using the first image forming mechanism in the (k*n+1)th image production, the image writing for the third elementary color toner image in synchronism with the sync clock signal detected immediately after the predetermined elapsed count measured by the signal counting mechanism after the detection of the proximate arbitrary reference mark during a (2*n+2)th rotation of the intermediate transfer member; and starting, by using the first image forming mechanism in the (k*n+p)th image production, the image writing for the third elementary color toner image in synchronism with the sync clock signal detected immediately after the predetermined elapsed count measured by the signal counting mechanism after the detection of the another proximate arbitrary reference mark during the (2*n+2)th rotation of the intermediate transfer member, wherein "k" is a positive integer satisfying $1 \leq k \leq p$ and indicates a number of image productions executed per two rotations of the intermediate transfer member, "*" is a multiplication sign, "n" is a positive integer satisfying $n \geq 0$ and n+1=m when "m" is the number of rotations of the intermediate transfer member, and "p" is a positive integer variant satisfying $2 \leq p \geq k$ and identifies the number of image productions.

28. The method according to claim 27, further comprising:
when one transfer sheet is printed during last two rotations of the intermediate transfer member, starting, by using the first image forming mechanism in the (k*n+1)th image production, the image writing for the first elementary color toner image in synchronism with the sync clock signal detected immediately after the detection of the proximate arbitrary reference mark during the (2*n+1)th rotation of the intermediate transfer member; and starting, by using the first image forming mechanism in the (k*n+1)th image production, the image writing for the third elementary color toner image in synchronism with the sync clock signal detected immediately after the detection of the proximate arbitrary reference mark during the (2*n+2)th rotation of the intermediate transfer member.

29. The method according to claim 20, further comprising:
discriminating length of the transfer sheet in the sheet conveyance direction by using a discriminator;
calculating, by using a calculator, a position to start the image writing based on a moving speed of the intermediate transfer member, the length of the transfer sheet in the sheet conveyance direction discriminated by the discriminator, and a spacing between the transfer sheets preset based on the length of the transfer sheet in the sheet conveyance direction; and
counting, by using the calculator, the sync clock signals detected immediately after the mark detection mechanism detects each proximate arbitrary reference mark before the image writing starts.

30. The method according to claim 20,
wherein a time difference between timings at which the first image forming mechanism is caused to start the image writing for the first elementary color toner image in a preceding image production and in a following image production during a (2*n+1)th rotation of the intermediate transfer member, and a time period required for the intermediate transfer member to move a distance between adjacent reference marks satisfies an equation T1=S*T2, wherein T1 is the time difference and T2 is the time period, "k" is a positive integer satisfying $1 \leq k \leq p$ and indicates a number of image productions executed per two rotations of the intermediate transfer member, "*" is a multiplication sign, "n" is a positive integer variable equal to or greater than 0, "p" is a positive integer variant satisfying $2 \leq p \geq k$ and identifies the number of image productions, and "S" is an integer equal to or greater than 1.

31. The method according to claim 20, further comprising: changing, by using an adjuster, the first reference count based on at least one of an environmental temperature, a number of prints, and a time period of usage.

* * * * *